Aug. 27, 1968  C. H. LITTLE ET AL  3,398,452
DRAFTING-DIGITIZING APPARATUS
Original Filed March 4, 1963  10 Sheets-Sheet 1

INVENTORS
CHARLES HUBBARD LITTLE
WALDO H. KLIEVER
EUGENE L. WIEMELS
Williams, David,
Hoffmann & Yount
ATTORNEYS Aug. 27, 1968
C. H. LITTLE ET AL
3,398,452
DRAFTING-DIGITIZING APPARATUS
Original Filed March 4, 1963
10 Sheets-Sheet 2
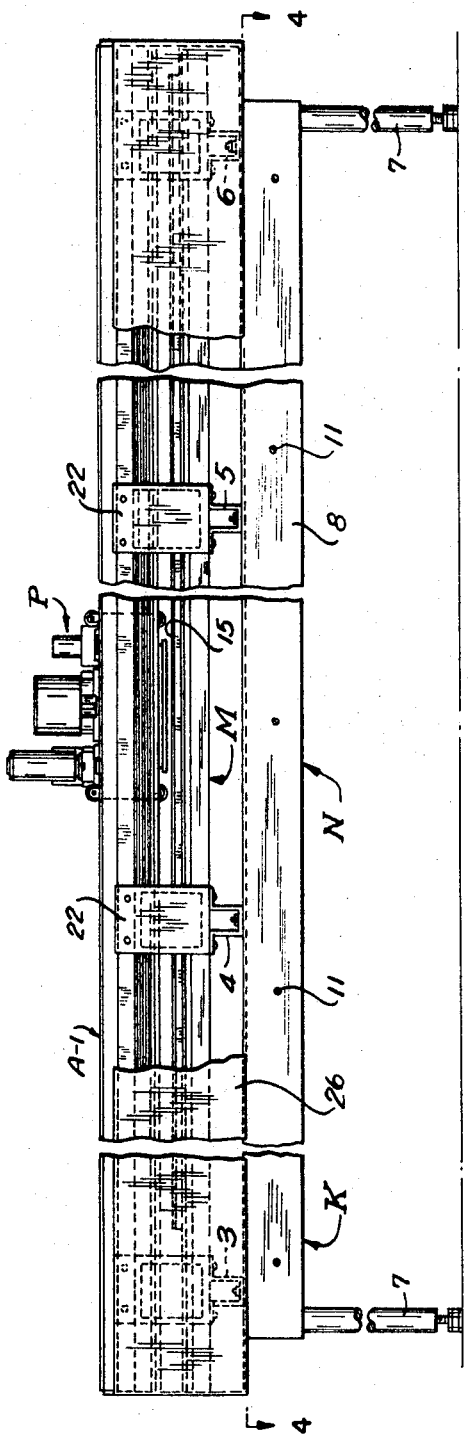
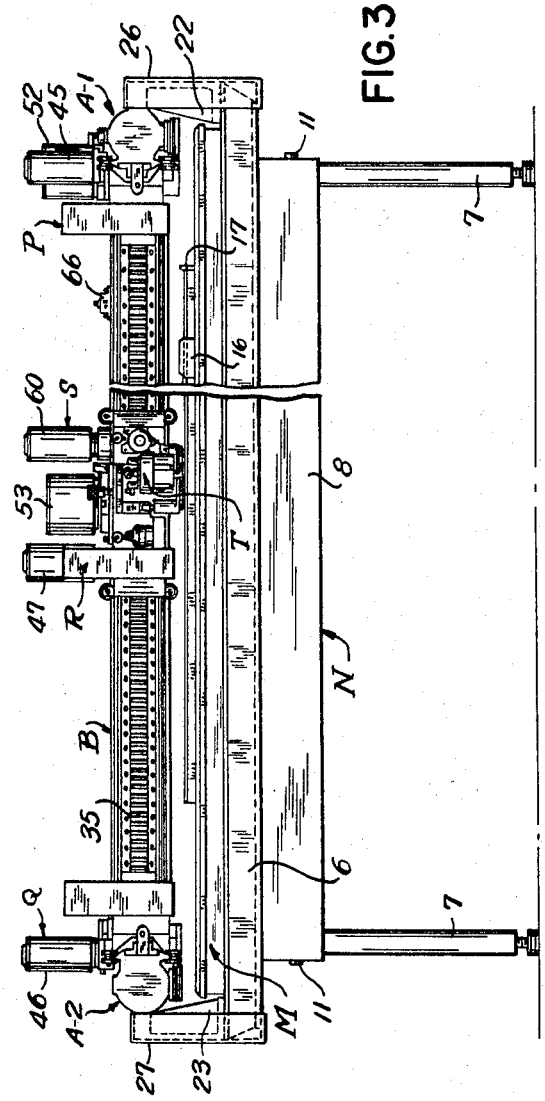
INVENTORS
CHARLES HUBBARD LITTLE
WALDO H. KLIEVER
EUGENE L. WIEMELS
*Williams, David,
Hoffmann & Yount*
ATTORNEYS

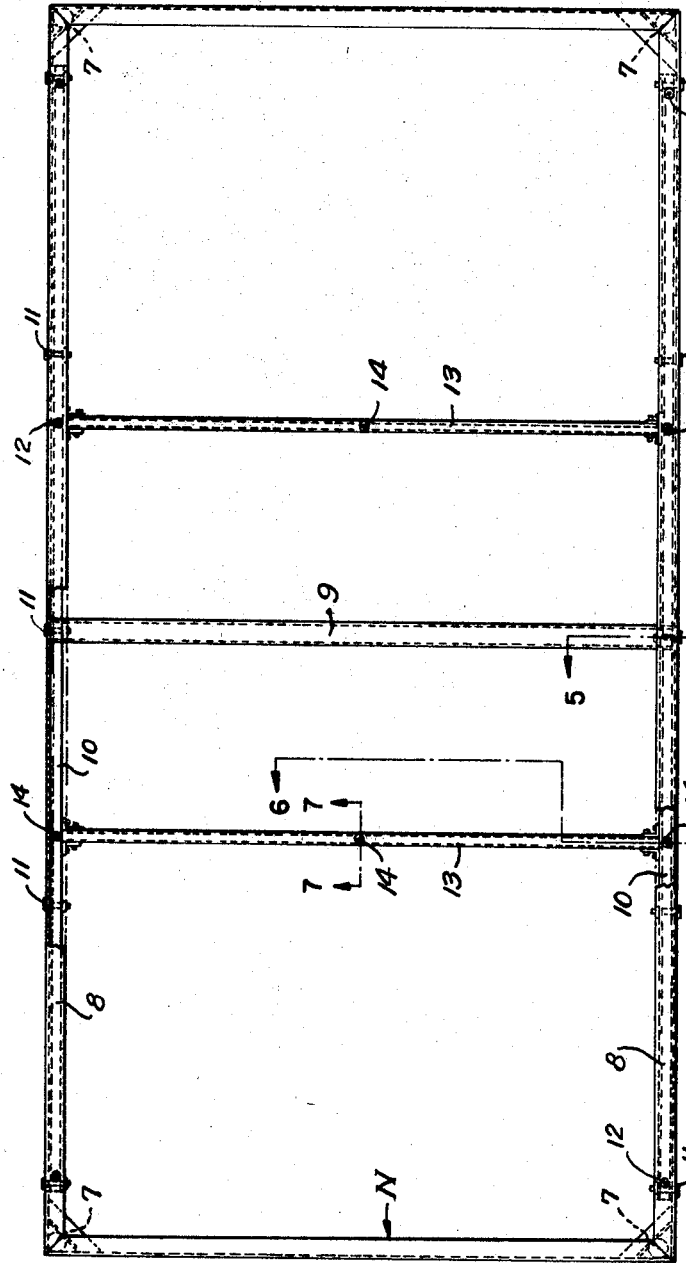
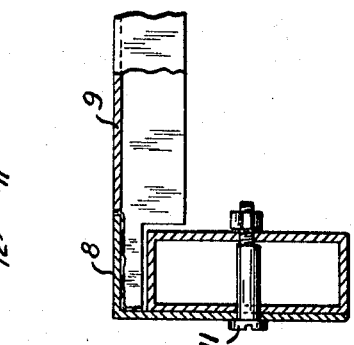
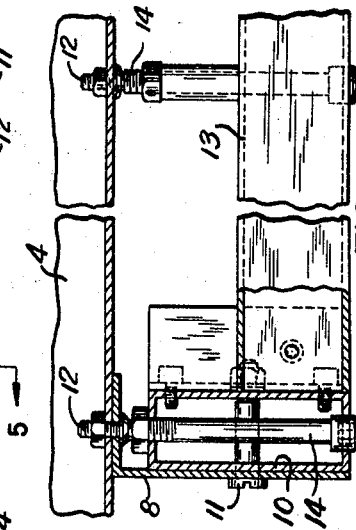
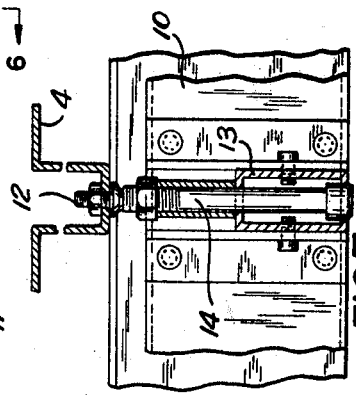

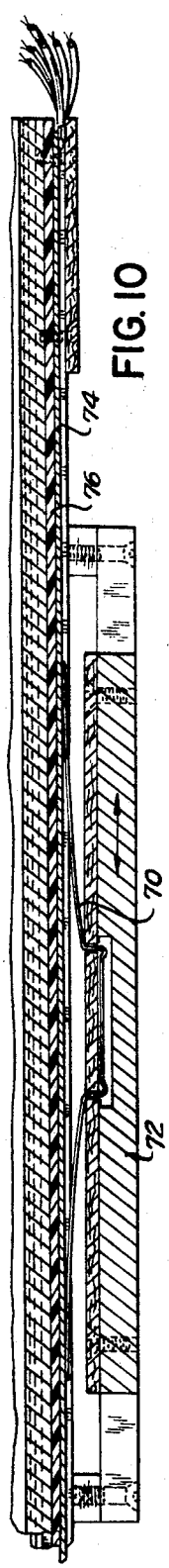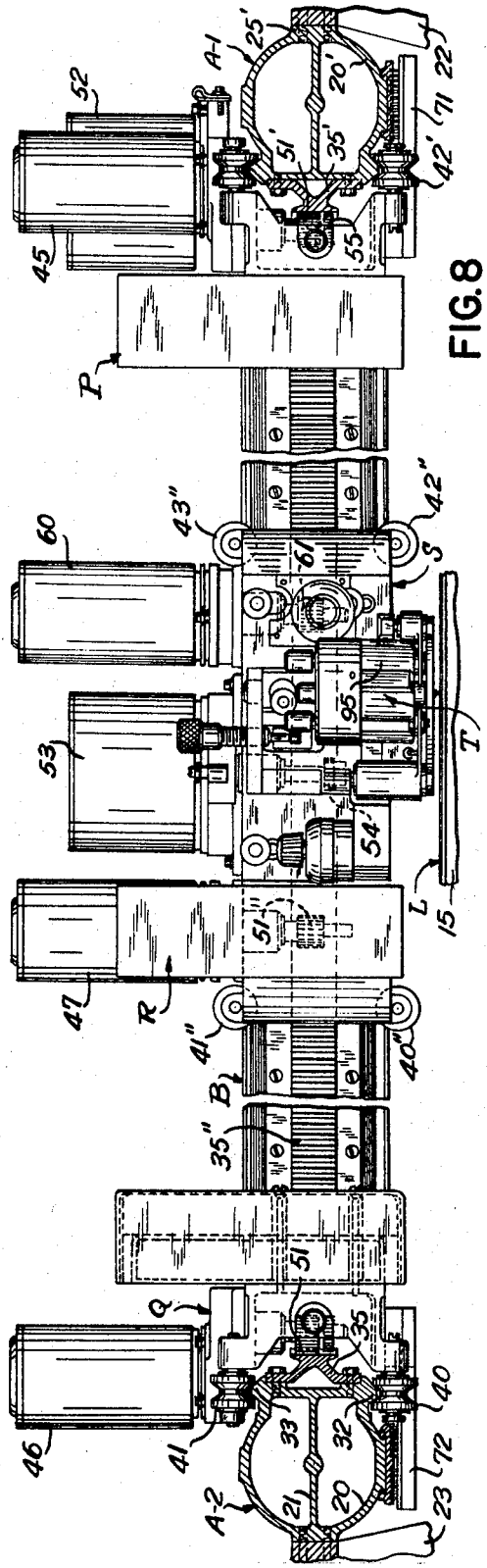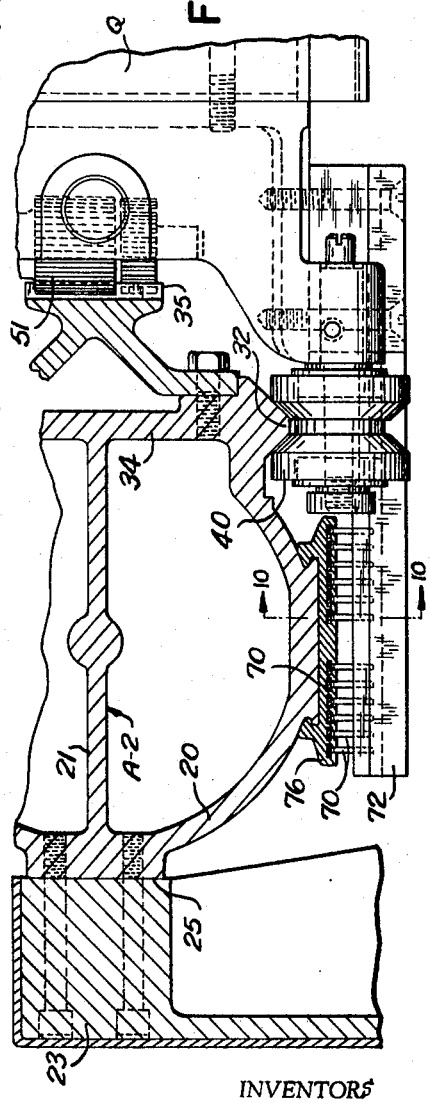

Aug. 27, 1968

C. H. LITTLE ET AL 3,398,452

DRAFTING-DIGITIZING APPARATUS

Original Filed March 4, 1963

INVENTORS
CHARLES HUBBARD LITTLE
WALDO H. KLIEVER
EUGENE L. WIEMELS

ATTORNEYS

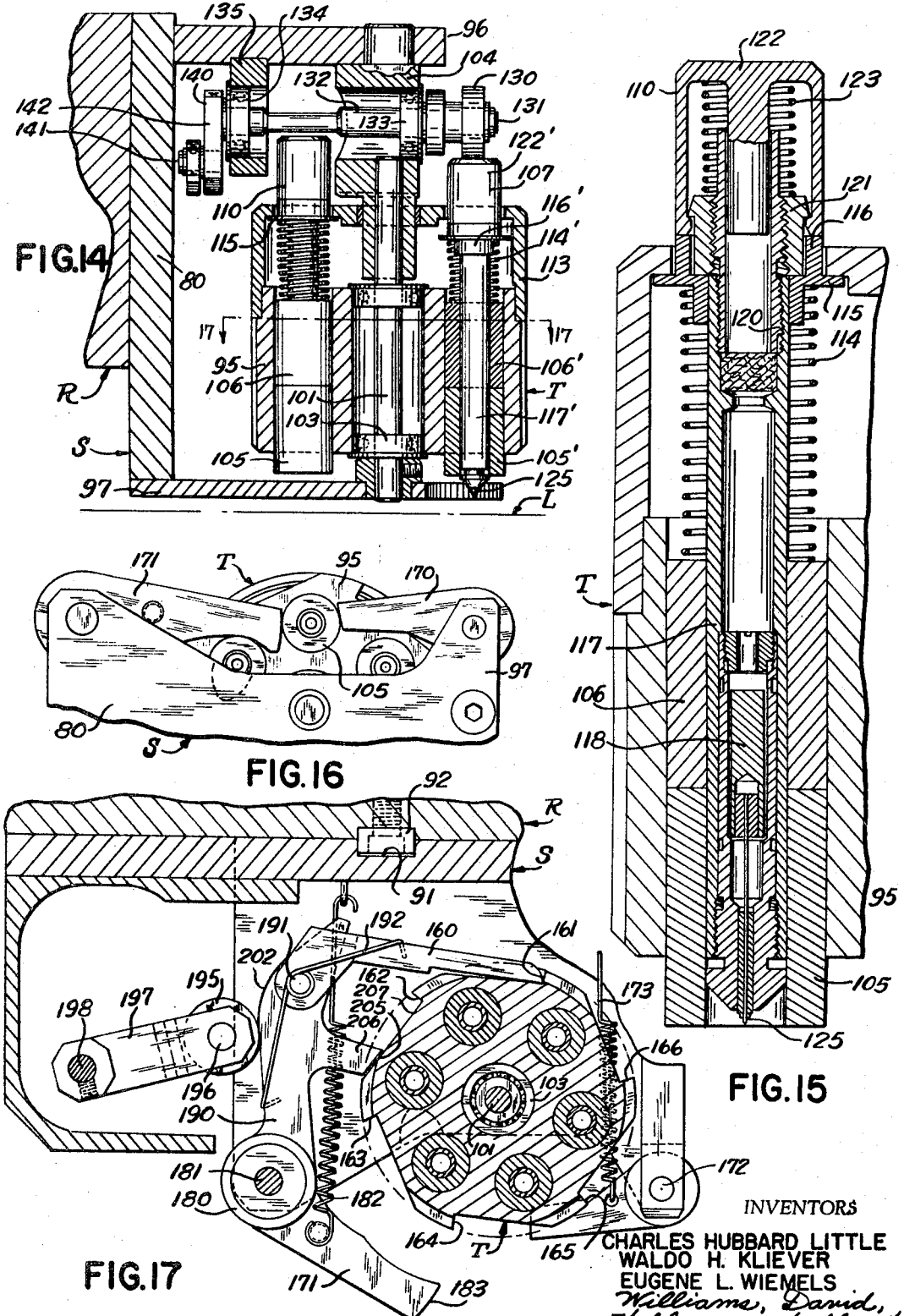

United States Patent Office 3,398,452
Patented Aug. 27, 1968

3,398,452
DRAFTING-DIGITIZING APPARATUS
Charles Hubbard Little, Cleveland, and Waldo H. Kliever and Eugene L. Wiemels, Cleveland Heights, Ohio, assignors to Universal Drafting Machine Corporation, Bedford Heights, Ohio, a corporation of Ohio
Continuation of application Ser. No. 262,590, Mar. 4, 1963. This application Mar. 2, 1966, Ser. No. 540,123
31 Claims. (Cl. 33—18)

The present invention relates to drafting and like apparatus.

This is a continuation of our application Ser. No. 262,590, filed Mar. 4, 1963, now abandoned.

One of the principal objects of the invention is the provision of a novel and improved drafting machine or like apparatus capable of making drawings including continuous or dash straight lines, curves, circles, etc., mathematically generated designs such as loft lines, loft drawings, templates, etc., and mirror-image or reverse drawings, etc., using pencils, pens, scribe tools, etc., under the control of or in accordance with information supplied from any source of absolute or incremental digital data, preferably any one of several commercially available contouring or positioning numerical control directors or systems utilizing manual, punched cards, tape, either magnetic or punched, etc., input media which can supply incremental X, Y, and Z and other axes command pulses and auxiliary command pulses or signals.

Another of the important objects of the invention is the provision of an apparatus which can be used for plotting a verification of product tapes, etc., intended to be used on numerically controlled production machines and the like and which can also follow a drawing, etc., and give position data at a visual station or in automatically typed program or tape format.

Further objects and advantages of the invention will be apparent to those skilled in the art to which it relates from the following description of the preferred embodiment described with reference to the accompanying drawings forming a part of this specification, in which similar reference characters designate corresponding parts, and in which:

FIGURE 2 is an elevational view, with portions broken away, of the apparatus shown in FIGURE 1, looking from the lower side of FIGURE 1;

FIGURE 3 is an elevational view of the apparatus shown in FIGURE 1, looking from the left side of FIGURE 1;

FIGURE 4 is a view approximately on the line 4—4 of FIGURE 2;

FIGURE 5 is a view approximately on the line 5—5 of FIGURE 4;

FIGURE 6 is a view approximately on the line 6—6 of FIGURE 4;

FIGURE 7 is a view approximately on the line 7—7 of FIGURE 4;

FIGURE 8 is an enlarged fragmentary sectional view approximately on the line 8—8 of FIGURE 1;

FIGURE 9 is an enlarged view of the lower left-hand portion of FIGURE 8;

FIGURE 10 is an enlarged fragmentary sectional view approximately on the line 10—10 of FIGURE 9;

FIGURE 14 is a fragmentary sectional view approximately on the line 14—14 of FIGURES 11 and 12, with portions in elevation;

FIGURE 15 is an enlarged sectional view of a portion of FIGURE 14 with portions in elevation;

FIGURE 16 is a fragmentary bottom view of a portion of the apparatus shown in FIGURE 11;

FIGURE 17 is a view approximately on the line 17—17 of FIGURES 12 and 14, with parts shown in a different operating position;

The present invention comprises a power driven table apparatus and related equipment and a control apparatus which supplies motion and auxiliary function command impulses or signals to the table apparatus and its related equipment for actuating or controlling the movements of the table apparatus. The control apparatus which supplies the motion and auxiliary function command pulses or signals may utilize various input media, such as manual control, magnetic or punched tape, punched cards, table signals, etc., which input is converted by data processing in the control apparatus and the table apparatus and its related equipment into accurate movements of the table apparatus. The command signals for the table apparatus and its related equipment may come from or be supplied by any one of a variety of sources, such as a numerical control continuous path or contouring control director, manually manipulated oscillators and multipliers, and/or computers. The output may be a drawing, or the like, or digital position data in decimal or binary-coded decimal form at a visible station or in automatically typed program or tape format.

Figure 1:
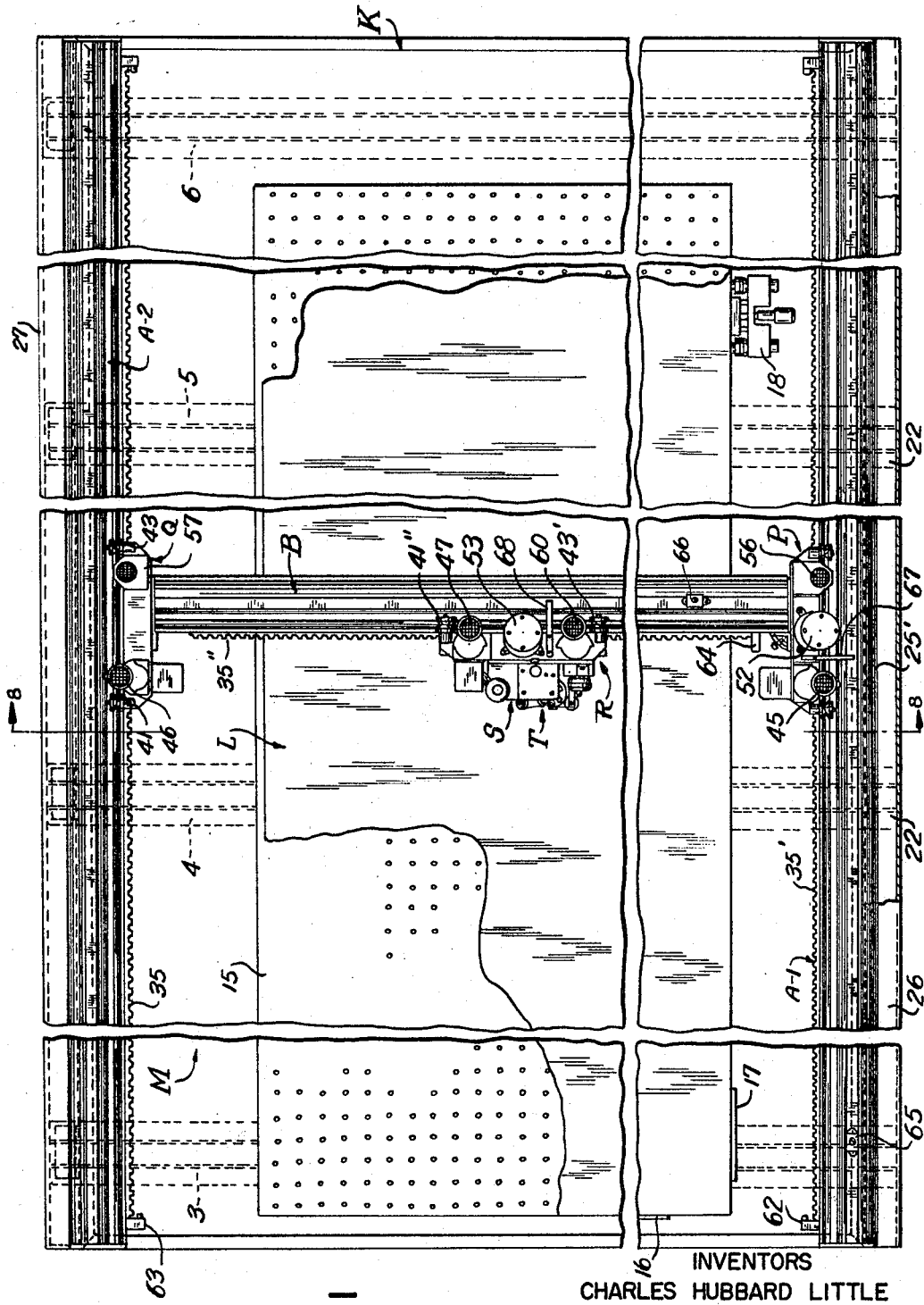
FIGURE 1 is a plan view of an automatic drafting machine forming a part of the preferred embodiment of the present invention.

Referring to the drawings, the apparatus shown comprises a table assembly K; two runway beams A-1 and A-2, also referred to as the A-1 and A-2 beams, secured to the table K, adjacent to its bottom and top edges, respectively, as the table is viewed in FIGURE 1; a first movable assembly including a third beam B, also referred to as the B-beam, having its opposite ends secured to carriages P and Q, supported by the A-1 and A-2 beams, respectively, for linear movement therealong, which assembly is sometimes referred to as the A or the A-axis assembly; and a second movable assembly including a carriage R supported on the B beam for linear movement therealong. The carriage R, with its auxiliary equipment is sometimes referred to as the B or the B-axis assembly. The carriage R is provided with a suitable instrument which is moved over the top of the table assembly K by movement of the A-axis assembly and/or the B-axis assembly in response to information received from the control apparatus. The invention is illustrated as embodied in an apparatus from making drawings and the like, and the instruments shown are marking type stylus, but as previously suggested, other suitable instruments may be attached to the carriage R.

The carriage R, as shown, comprises a stylus head S, including an indexible turret T, having a plurality of different marking devices or styli, that is, pens, pencils, scribers, engraving tools, etc., supported therein and indexibly selectively into an operation position or station and selectively movable when in operation position in a direction normal to the plane of the top of the table K into and out of working or marking position, that is, into or out of contact with the drawing paper or other marking material or article to be marked on the table top.

In the subsequent description of the drafting apparatus shown, movement of the A assembly, including beam B and carriages P and Q, along beams A–1 and A–2 and in turn movement of a stylus carried by the B assembly, including carriage R and stylus head S, from left to right and vice versa, as viewed in FIGURE 1, is referred to as movement in or along the A-axis in a plus or minus direction, plus being toward the right and minus toward the left. In like manner, movement of the B assembly, including carriage R and stylus head S along the B-beam and in turn a stylus carried thereby toward the bottom and top beams A–1 and A–2, as movement in or along the B-axis in a plus or minus direction, plus being toward beam A–2 and minus being toward beam A–1. Movement of the stylus in operative position into and out of engagement with the drawing paper L or other material to be worked upon and supported on table K, that is, in a direction normal to the top of the table is referred to as stylus down and stylus up directions, down being movement of the stylus toward the table and up being movement away from the table.

Movement of carriages P and Q along beams A–1 and A–2, that is, movement of the A assembly along the A-axis; movement of B assembly, that is, carriage R along beam B; and movement of the stylus in operative position into and out of working or marking position, that is, movement at right angles to the plane of the table top, as well as indexing of the stylus turret, etc., are under the control of the control apparatus. In the embodiment of the invention illustrated the control apparatus is a numerical continuous path or contour control director similar to that employed as a contouring control for machine tools and more particularly a TRW–3000 control system or director produced by Thompson Ramo Wooldridge, Inc.

The control apparatus mentioned operates from a standard 1″ punched tape and supplies information to the drafting apparatus in the form of appropriate incremental X and Y pulses for controlling movement of the stylus head along or in the directions of the A and B table axes and additional pulses or signals for performing auxiliary operations, such as, "down" and "up" signals for controlling movement of the stylus in the operating position toward and from the table top, and "index" pulses or signals for indexing the stylus turret, etc. The table apparatus and its related equipment accepts the command pulses or signals from the control apparatus and converts them through appropriate data processing and servo apparatus into accurate movements of a stylus to produce drawings and the like. In an inverse manner a stylus can be made to follow a drawing, etc., and the apparatus made to emit digital position data in decimal or binary-coded decimal form at a visual station or on a tape, etc.

The table K, shown, includes a fabricated prestressed aluminum table top M or work support provided with a flat linoleum surface to which a drawing material L or the like, to be marked, scribed or engraved, etc., may be secured by tape or other conventional means. The table top M may be supported in any position, for example, horizontal or vertical, by any appropriate means. The top M is shown as supported in a horizontal position upon a plurality of aluminum channel members or cross girders 3, 4, 5, 6 secured to a suitable sub-table structure N including legs 7 fitted with leveling adjustments and vibration absorbing pads. The sub-table N comprises a rectangular frame 8, sometimes referred to as "apron," formed of heavy aluminum angles reinforced at the corners by angle braces. The table shown is slightly more than twice as long as it is wide and the table top M overhangs the sub-table N a small amount. The frame 8 may be reinforced by one or more transverse channels 9 suitably connected thereto as shown in FIGURE 7. Each of the long sides of the apron 8 is provided with an extruded aluminum truss bar 10, the cross-sectional shape of which is rectangular. The tops of the truss bars are spaced a short distance below the inwardly projecting top flanges of the apron and are substantially as long as the side of the apron which they adjoin. The ends of the truss bars are connected to the vertical flange of the apron adjacent thereto by bolts 11 extending through aligned holes in the bars and apron and in which they engage, preferably without undue looseness. A plurality of similar bolts are spaced intermediate the end bolts, but the holes in the apron through which these bolts extend are slightly elongated vertically.

The table top M is placed upon the apron 8 of the sub-table with the girders 3–6 resting upon the top of the long sides of the apron 8 and bolted to the top flange thereof by bolts 12 having round heads located at the underside of the top flange of the apron and spaced above the underlying truss bar. Lock washers may be interposed on the bolts between the underside of the girders and the top of the apron and/or underneath the heads or nuts. The two longitudinally extending truss bars are connected by extruded aluminum tie bars 13, also rectangular in cross section and connected to angles by suitable recess headed screws, which angles are in turn connected to the truss bars by similar screws. One of the tie bars 13 is located underneath each of the two girders 4 and 5 or the table top M.

The truss and tie bars 10 and 13 are provided with vertically extending recess headed bolts or jackscrews 14 used for leveling the table top M. Each screw 14 extends vertically through the bar in which it is supported and is provided at its upper end with a nut which can be used to raise or lower the screw in its respective bar. The upper ends of the jackscrews 14 abut the head of one of the bolts 12, previously referred to. Since the tie bars 13 are shown only about half as deep as the truss bars 10, tubular spacers are interposed between the top walls of the tie bars and the nuts of the jackscrews or bolts carried thereto. With the table top M bolted to the sub-table N and the bolts 11 slightly loosened so that relative movement can take place between the parts of the apron 8 and the truss bars 10 between the end bolts 11, the jackscrews 14 may be rotated relative to their nuts to raise and lower the upper ends thereof and thus level the work surface of the table top M and the bolts 11 thereafter tightened. The construction just described provides a relatively light table structure requiring merely four legs, but the top working surface of which can be made and maintained level. In the present instance the top 4 is provided with an all aluminum vacuum chuck 15 placed thereon and having paper engaging and locating fixed corner stops 16, 17 on the lower right-hand corner of the chuck and an adjustable stop 18 attached to its lower right-hand edge. As will be understood, the drafting paper L, shown on the chuck 15 may be moved or positioned by the adjustable stop 18 to orient a drawing thereon in the plane of the trackways on beams B, A–1 and A–2 along which the A and B assemblies move.

The vacuum chuck 15, shown, comprises a cast aluminum sub-base having air grooves milled therein in the form of a grid and a cover plate or sheet of anodized aluminum which serves to provide the drawing or work receiving surface. The ends of the grooves in the sub-base are closed and the grooves are connected to a suitable vacuum pump not shown. The cover sheet has a plurality of small holes drilled therein and which communicate with the grooves milled in the sub-base. In the embodiment shown, the holes are spaced on 1½" centers and have a diameter of .025". The chuck is adapted to hold drawings smaller than the area provided with holes by using masks to mask off or close the holes not covered by the drawing. A vacuum actuated circuit control is provided for stopping the operation of the apparatus if the vacuum fails.

The accuracy of the drafting apparatus is largely dependent upon the straightness and alignment of beams A–1, A–2 and B and the accuracy with which carriages P, Q and R are moved therealong. Since the beams are alike and since the carriages are connected to the respective beams upon which they are supported in like manner only the A–2 beam and the manner in which the carriage Q is connected thereto will be described in detail. The corresponding parts of beams A–1 and B and carriages P and R will be designated by the same reference characters with prime and double prime marks affixed thereto, respectively.

Beam A–2 is a hollow tubular aluminum extrusion 20 which provides rigidity in both bending and torsion modes and has an integral stiffening cross rib 21 in a plane parallel with the plane of the working surface of the table top, beams A–1 and A,2 are secured to the table K by a plurality of longitudinally spaced brackets 22, 23, respectively, detachably bolted to opposite ends of the channel members 3 to 6 at the sides of table top along which they extend and to planar ribs 25, 25' along the left and right hand side of the beams A–2 and A–1 as they are viewed in FIGS. 3 and 8. The brackets 22, 23 and the outer sides of the beams A–1 and A–2 are protected by movable covers 26, 27, respectively, suitably connected to the table. Oppositely facing V-ways 32 and 33 are precision machined on the upper and lower side of beam A–2 directly above and below the right-hand side 34 of the beam as viewed in FIG. 9. The side 34 of the beam is planar and has a precision rack 35 thereon formed by a plurality of aligned short rack sections detachably bolted thereto.

The V-ways on beams A–1 and A–2 form trackways or guideways for carriages P and Q to which the ends of the B-beam are connected. The carriage Q is supported on the beam A–2 by four ball bearing rollers 40, 41, 42, and 43 having hour-glass shaped treads for engagement with the V-ways on the beam and adjustably connected to the carriage Q so that they can be set to snugly fit the ways. Carriages P and R, as previously stated, are supported on the respective beams A–1 and B along which they travel in similar manners and the corresponding parts are designated by the same reference characters having prime and double prime marks applied thereto, respectively. The carriages are aluminum castings designed for rigidity and light weight and the opposite ends of the B-beam are connected to the carriages P and Q, so as to provide adjustment for mechanical squareness while allowing a little freedom to avoid stress.

Carriages P, Q and R are moved along their respective beams A–1, A–2 and B by servo motors 45, 46 and 47, respectively, which in the present instance are 400 cycle 2 phase alternating current motors. The motors are provided with 400 cycle tachometer generators 48, 49 and 50 (see FIG. 19) for stabilization purposes and are connected to the precision racks 35, 35' and 35" by suitable gearing including precision pinions 51, 51' and 51", respectively, in mesh with the upper portions of the racks. Carriages P and R are also provided with digital incremental transducers 52 and 53, respectively, also connected to the racks 35' and 35", by gearing including precision pinions 54 and 55 in mesh with the lower parts of the racks 35' and 35", respectively. The racks have relatively wide faces and the fact that the pinions connected to the drive motors engage the upper parts of the racks while the pinions connected to the transducers engage the lower parts thereof prevents any wear occurring as a result of the power drive from being reflected in the measuring or feedback mechanism. Carriage P is further provided with a synchro transmitter 56 geared to rack 35' and carriage Q with a synchro control transformer 57 geared to rack 35, and which are utilized to maintain constant working coordination between the two carriages P and Q, both of which carriages receive their basic drive signals from the same command. Carriage R is further provided with a mechanical inertia balancer 60 which compensates for the difference in weight between the movable A and B assemblies. The inertia balancer 60, shown, comprises a cylindrical flywheel of suitable weight connected to the rack 35" of beam E by gearing including a pinion 61 engaging the upper part of the rack 35". When the carriage R is moved back and forth along the B-beam the flywheel rotates and provides an inertia balance serving to compensate and make the moments of inertia of the B assembly equal to or look like the moments of inertia of the movable A assembly. The left-hand end of beams A–1 and A–2 are provided with adjustable stops 62 and 63 for limiting movement of carriages P and Q toward the left, as viewed in FIG. 1, and beam B is provided with a similar stop 64 for limiting movement of carriage R toward beam A–1, the table or board zero being adjacent to the lower left-hand corner of the table. Beams A–1 and B are provided with microswitches 65 and 66 actuated by suitable strips 67 and 68, on carriages P and R, respectively, as the carriages approach the stops 62 and 64.

The electrical transmission between the stationary part of the control circuitry, most of which is housed in a control console, and the movable A and B assemblies is by a plurality of spring sliding contacts 70, see FIGS. 8, 9 and 10, carried by brackets 71, 72 and 73 on the movable carriages P, Q and R and slidably engaging conductors 74 carried by the beams A–1, A–2 and B, respectively. The conductors 74 on the beams are positioned in grooves in extruded plastic strips 75, 76 and 77 having dove-tail connections with undercut pads on the undersides of beams A–1, A–2 and B, respectively. Each circuit includes four parallel connected sliding contacts. The sliding contacts or brushes and the conductors with which they engage are made of or laminated with noble metal and are underneath the beams where they are out of the way and protected against damage.

As previously indicated, the preferred embodiment of the invention includes stylus head S, comprising an indexible turret T provided with a plurality of styli. It is, however, to be understood that this head is interchangeable on carriage R with any other suitable mechanism.

Referring particularly to FIGS. 11–17, the stylus head shown comprises a fabricated frame 80 connected to carriage R for movement toward and from the plane of the table K by cap screws 81, 82, 83 and 84 projecting through elongated slots in frame 80 and threaded into suitable tapped apertures in carriage R. The cap screws have enlarged washers immediately underneath their heads and saucer-like resilient or Bellville washers therebetween and the surface of the frame 80. The cap screws are tightened sufficiently to cause the washers to resiliently hold frame 80 against carriage R so that it can be readily adjusted to take care of directing of scribing material of different thickness, etc. toward and from the plane of table A upon manual rotation of an adjusting screw 85 threaded into a tapped aperture in frame 80 and having its lower end rotatably connected to a forwardly extending projection 86 on a member 87 secured to carriage R. Frame 80 has a vertical slot 90 therein through which extension 86 of member 87 projects and a groove 91 into which a part of member 87 engages and which together with a member 92 secured to carriage R below member 87 and projecting into the same slot 91 keys and guides the stylus head as it is adjusted toward or from the working surface of table K.

Stylus head S, as previously stated, includes an indexible turret T comprising a generally cylindrical member 95, supported in bracket assemblies 96, 97, forming parts of frame 80, for rotation about an axis normal to the drawing surface of table K on a shaft or pin 101 by a pair of spaced anti-friction bearings 102, 103. Pin 101 is fixed in the bracket 97 and a member 105 connected to bracket 96. Turret member 95, as shown, is provided with a plurality, in the present instance, six cylindrical apertures parallel with its axis of rotation and within each of which is secured a pair of upper and lower bushing members, designated 105, 106, and 105' and 106', in FIGS. 14 and 15, for slidably supporting suitable styli 107 to 112. Turret T also includes an inverted cup-shaped cover member 113 connected to its upper end and having apertures therein through which the styli may be inserted and removed and through which the upper ends of the styli project. The turret also includes a plurality of light springs, designated 114 and 114' in FIGS. 14 and 15, each interposed between one of the upper stylus supporting bushings and a flanged washer-like member, designated 115 and 115' normally engaging the underside of turret cover 113. Each flanged washer-like member has a boss, similar to boss designated 116 in FIG. 15, projecting upwardly through turret cover 113. The particular construction of one of the various styli that may be used, that is, stylus 110, is shown in considerable detail in FIG. 15. Stylus 110, shown in FIG. 15 is utilized to make ink lines on a drawing and, for purposes of illustration, is a duplicate of stylus 107.

The two styli 107, 110, are shown in operating and inoperating stations, respectively, and the corresponding parts are designated by like reference characters with prime marks affixed to those applied to stylus 107. Stylus 110 includes a cylindrical tubular body 117 slidably received in the pairs of aligned stylus supporting upper and lower bushing members 106, 105, fixed in the turret member 95.

Stylus body 117 has an inking assembly, designated generally as 118, detachably threaded, in its lower end. It is to be understood, however, that any suitable marking, scribing or engraving device or tool may be substituted for the inking assembly 118 shown. The upper end of the stylus body 117 has a tubular member 120 detachably fixed thereto as by being threaded thereon, the intermediate portion of which is provided with a plurality of threads upon which a member 121 is threaded. Member 121 has an external annular flange adjacent to its upper end adapted to overlie and engage an oppositely facing internal annular flange adjacent the lower inside edge of an inverted cup-shaped or cap member 122. Member 120 is tubular, projects above member 121 and cap 122 has a cylindrical projection extending into the upper end of the opening in the member 120 which guides the cap member as it is moved relative to members 120 and 121. Cap member 122 is urged in an upward direction, as viewed in FIG. 15, to engage the annular flanges, referred to, by a spring 123 interposed between the upper end of member 121 and the inside of cap 122. Spring 123 surrounds the upper end of member 120 and the cylindrical downwardly projecting boss on the inside of cap 122. The lower edge of cap member 122 engages the upper edge of flange 116 on the washer-like member 115 and the lower edge of member 121 engages the upper side of washer member 115 inside of flange 116. It is recognized that it is difficult to have both of the aforementioned surfaces in contact with one another and it is immaterial which of the two surfaces contact.

From the foregoing description, it is believed that it will be apparent that stylus 110 including body member 117, tubular members 120 and 121, cap member 122 and spring 123 can be removed and inserted bodily into the turret T. This facilitates the supplying of the turret with any particular desired type of stylus.

It is further believed that it will also be apparent that the working end of the stylus, designated 125, can be moved into engagement with the paper or other article to be marked on the table therebeneath by depressing the cap member 122. As the cap member is depressed the stylus assembly 110, and the washer-like member 115 move downwardly against the action of the light spring 114. When the point 125 of the stylus meets resistance by its engagement with the article to be marked on the table therebelow, continued pressure on the cap 122 moves washer 115 and cap 122 downwardly relative to the stylus proper including body 117 and members 120 and 121 and the other parts of the stylus fixedly connected thereto and the point of the stylus is pressed against the article to be marked through action of spring 123. The strength of this spring 123 can be made to fit any particular marking device in the stylus body 117 or forming a part of the stylus. Obviously, a heavier spring is required for scribing a metal part than applying an ink mark to drafting paper.

Figure 11:
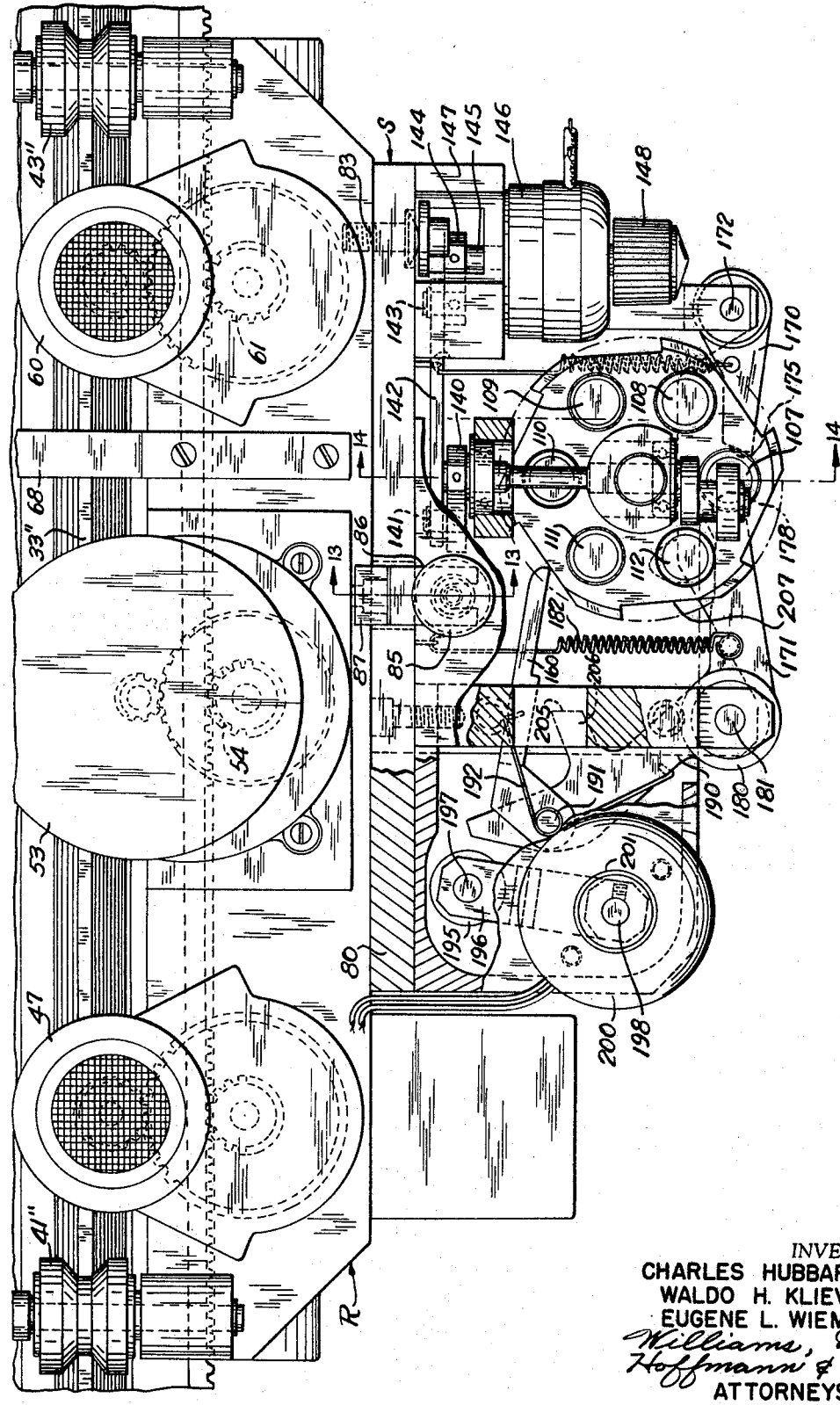
FIGURE 11 is an enlarged plan view with parts broken away and in section of a portion of FIGURE 1.

The operating position for the styli carried by the indexible stylus turret 95 is the right-hand position, as viewed in FIGS. 1 and 14 and the near position, as viewed in FIGS. 3 and 11.

Figure 12:
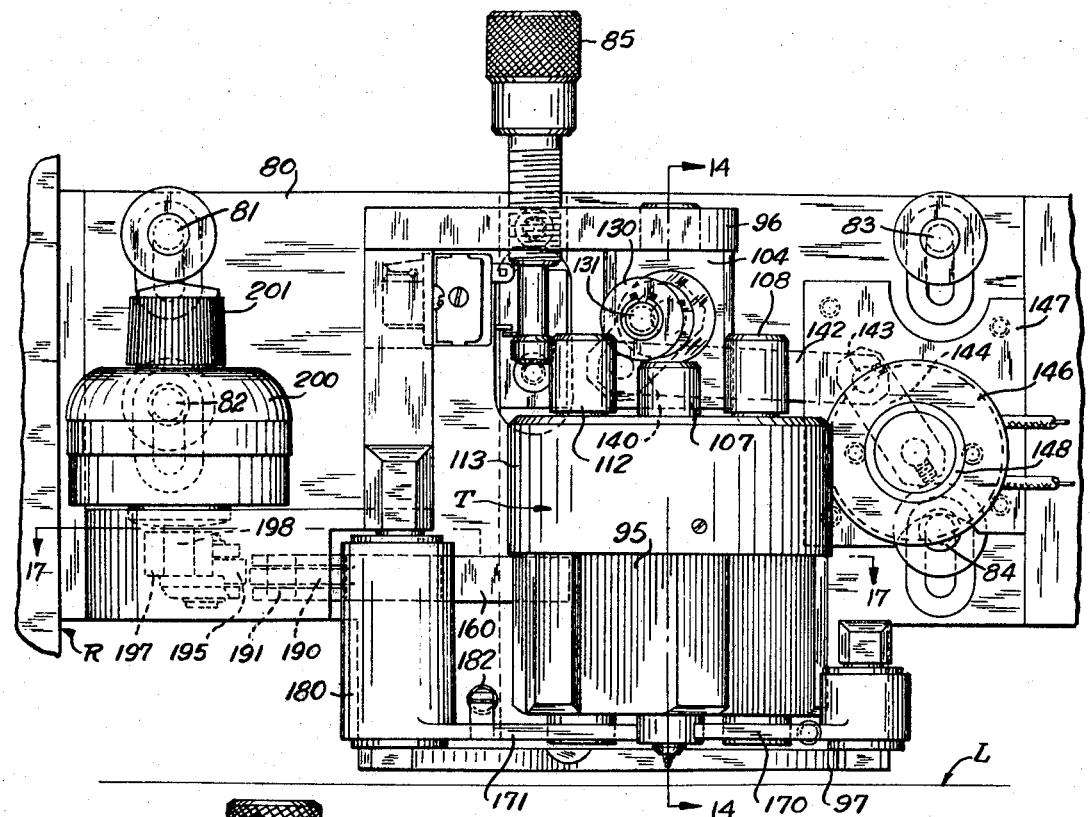
FIGURE 12 is an enlarged front elevational view of a portion of FIGURE 11.
Figure 13:
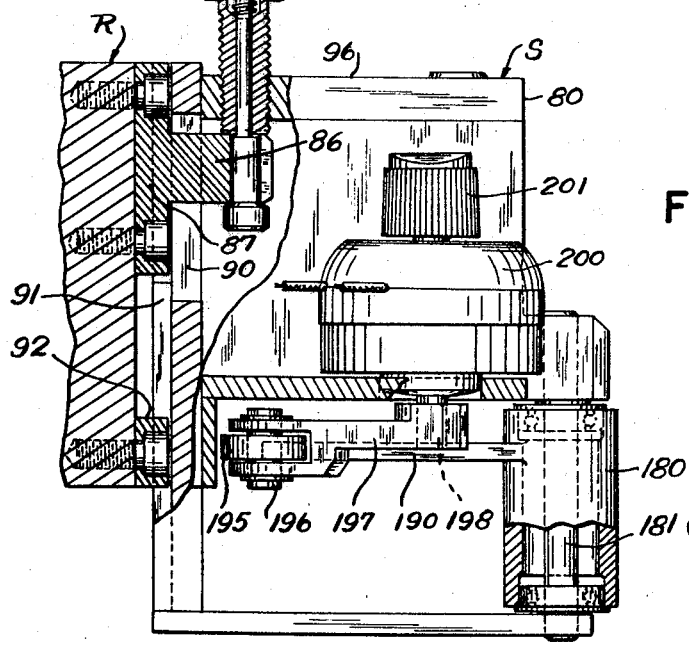
FIGURE 13 is an end elevational view looking from the left of FIGURE 12 with portions in section approximately on line 13—13 of FIGURE 11.

The stylus in this position is moved into and out of contact with the working surface therebelow by a ball bearing supported roller 130 on a projecting crank 131 on the end of a shaft 132 rotatably supported in the frame 80 by spaced anti-friction bearings 133, 134. The bearing 133 is carried by the member 104 of the frame 70 and the bearing 134 by a member 135 fixed to the bracket 96. The projecting end of the shaft 132 upon which the roller 130 is supported is such that as the turret T is indexed to move a stylus into the operating position or station the upper end of the stylus is depressed as indicated in FIG. 14 by the roller 130 to move the working end of the stylus about half the distance which it must travel to move from rest position shown at the left side of FIG. 1 to working position in engagement with the work on the table. The shaft 132 is subsequently oscillated about its axis of rotation to cause the roller 130 to move the working end of the stylus into and out of contact with the drawing surface, etc. therebelow. The end of the shaft 132 opposite that to which the roller 130 is connected has a crank arm 140 fixedly secured thereto, the projecting end of which crank arm is connected by a pin 141 to a link 142 extending towards the right, as viewed in FIGS. 11 and 12, and connected at its opposite end by a pin 143 to an arm 144 secured to a rotatable shaft 145 of an oscillating solenoid 146 carried by a bracket 147 forming part of the frame 80. The shaft 145 projects through the solenoid 146 and the forwardly projecting end, as viewed in FIGS. 11 and 12 is provided with a knurled knob 148 for manual oscillation of the shaft 145 and in turn reciprocation of the stylus in the working station on position.

From the foregoing it will be apparent that the stylus in the operating or working station can be moved into and out of contact with the drawing surface underneath either by manipulaton of the knob 148 or by energizing and deenergizing of the solenoid 146.

The stylus turret T is indexed in steps of 60° to move the styli carried thereby sequentially into the working station or position. In the embodiment shown, the turret is rotated clockwise, as viewed in FIGS. 11 and 17, and the indexing is effected by the engagement of an indexing pawl 160 with ratchet teeth formed on the periphery of the turret body 95. In the present instance there are six ratchet teeth 161–166 corresponding with the six styli 107–112 carried by the turret. When in any indexed position the turret is accurately located and held thereon by the engagement of two members or lever arms 170, 171 with opposite sides of the lower bushing member in the operating station corresponding to the bushings 105 and 105', previously referred to and within which bushing the particular stylus in the working station is carried. The lever 170 is pivotally connected by a pin 172 fixed to the frame 80 of the stylus head S for rotation about an axis parallel with the axis of rotation of the turret T and at the right of the stylus in the operating station, as shown in FIG. 11. The lever 170 is biased by a spring 173 connected thereto and to the rear wall of the frame of the stylus head. The end 175 of the lever 170, which end engages the periphery of the lower stylus bushing is ground to a shape with respect to the pivotal axis of the lever such that as the spring 173 pulls it in a clockwise direction it functions as a cam surface to urge or hold the opposite side of the periphery of the stylus bushing against the end 178 of the lever 171.

The lever 171 which engages the side of the lower stylus bushing in the operating station opposite to that engaged by the lever 170 is one arm of a bell crank-type lever mechanism 180 pivotally connected by a shaft 181 carried by the frame of the stylus head for oscillation about an axis parallel to the axis of the stylus turret and at the side of the stylus in the working station opposite to the axis of the lever 170. The lever 171 is biased by a spring 182 in a counterclockwise direction, as viewed in FIGS. 11 and 16, and the end 178 thereof which engages the stylus bushing in the operating station is formed preferably by grinding to a radius about its axis of rotation tangent to the stylus bushing when the stylus carried thereby is in the exact desired indexed position. The spring 182 is connected to the lever 171 and to the rear wall of the frame of the stylus head.

The bell crank lever assembly 180 includes a second lever arm 190. The index pawl 160, previously referred to, and which engages the ratchet teeth 161–166 on the periphery of the stylus turret body member 95, is pivotally connected by a pin 191 to the lever 190 adjacent to its free end. The pawl 160 is biased into engagement with the periphery of the stylus turret member 95 by a spring 192 connected thereto and to the lever arm 190. The bell crank lever 180, which is biased by the spring 182 in a counterclockwise direction, is normally in the position shown in FIG. 12, and is moved in a clockwise direction to move its arm 171 free of the stylus bushing in the operating station and to cause the pawl 160 to engage the proper ratchet tooth of the stylus turret and index the turret 60° by a roller 195 carried on a pin 196 in the free end of a lever 197 fixed to the lower end of the rotor shaft 198 of a rotary solenoid 200. As the lever 197 is rotated either by energization of the solenoid 200 or by manual movement of a knurled hand grasp or knob 201 connected to the upper end of the shaft 198, in a clockwise direction, the roller 195 engages a cam-like surface 202 on the left-hand side of the lever 190, as viewed in FIGS. 11 and 17.

When the lever 197 has completed its clockwise rotary movement the parts are approximately in the positions shown in FIG. 17 with an abutment surface 205 on a projection 206 of lever 190 in engagement with one of the surfaces forming the ratchet teeth on the turret, such as, the surface 207. This limits movement of the indexing mechanism including index pawl 160 and levers 190 and 196, etc., in the indexing direction. When the solenoid 200 is deenergized or the knob 201 released, as the case may be, the pawl 160, levers 171, 190 and 196 are returned to their normal positions, that is, the positions shown in FIG. 11 under the action of the spring 182. As the lever 171 is rotated counterclockwise from the position shown in FIG. 17 to the position shown in FIG. 11 it moves into engagement with the bottom bushing of the stylus just moved from the operating station and pulls the turret around with it until the lower bushing for the stylus being indexed into the operating station abuts against its end 178. This completed the indexing movement of the stylus turret. In other words, the free end of lever 171 comes to rest against the stylus bushings in the operating station and the next succeeding station and the engagement of the lever 171 with the two bushings, referred to, limits movement of the indexing mechanism including the levers 171, 190 in a counterclockwise direction and positions the turret. As the stylus being indexed into the operating station moves therein it moves down slightly, as previously mentioned, and as the lower stylus bushing clears the end of lever 170 it drops in behind the stylus bushing and wedges it against the surface 178 on lever 171.

The control works on the closed-loop principle and the control apparatus emits a plurality of series of incremental electrical common pulses for controlling movement of the A and B assemblies, each having a value of .001″ movement for the movable assembly which it controls. Since there are only two movable assemblies A and B in the apparatus illustrated, only two series of impulses, that is, plus and minus X-axis impulses and plus and minus Y-axis impulses are required to operate the apparatus. It is to be understood that other commands, for example, Z-axis and rotary motions, etc. pulses can also be coded into the tape, if desired. Two command pulse channels are provided for each motion, one for producing motion in the plus or positive direction and the other in the minus or negative direction. Similar feedback pulses also having a value of or the equivalency of .001″ of movement are produced by the transducers 52, 53.

Figure 19:
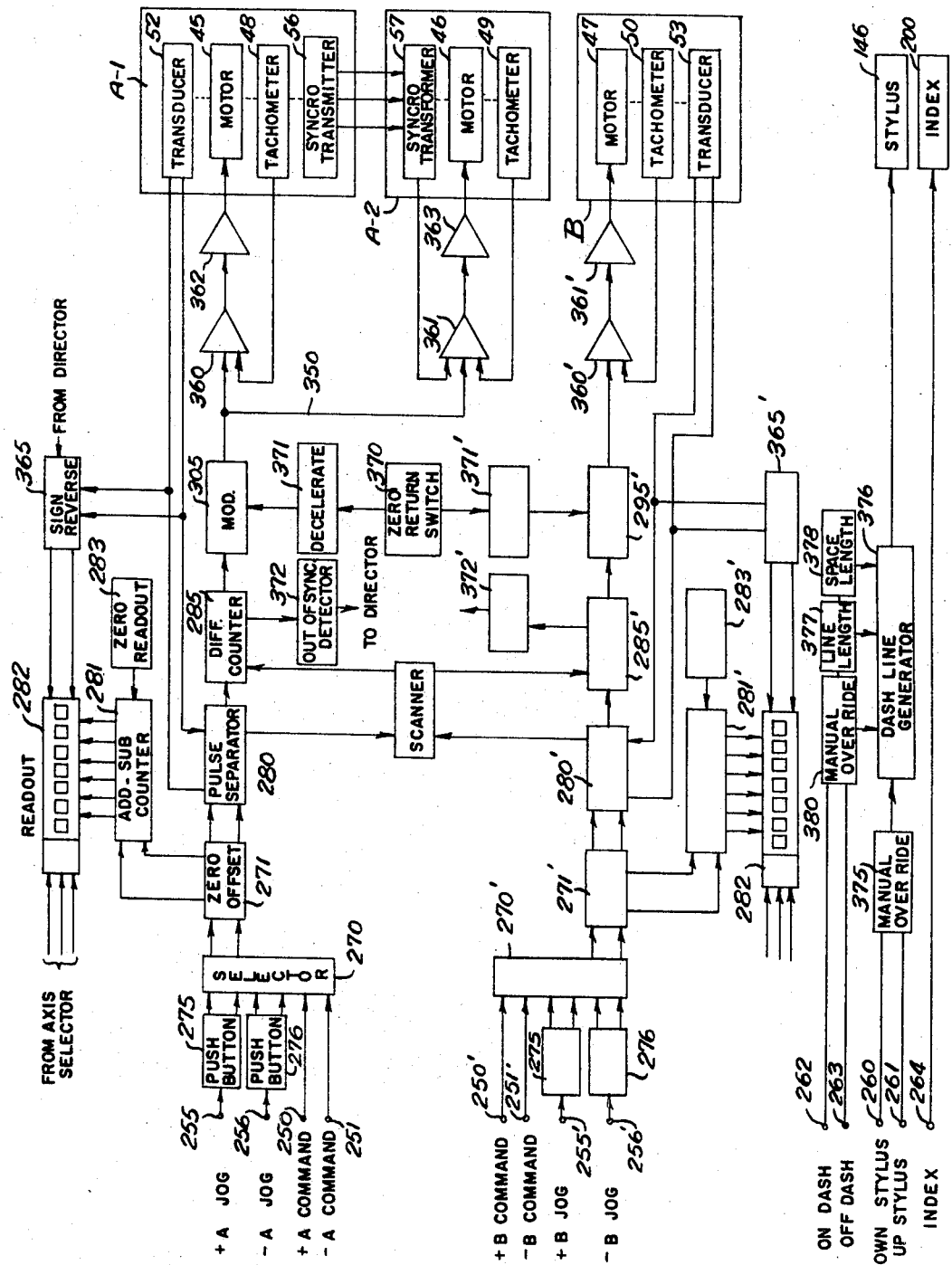
FIGURE 19 is a block diagram of part of the electric control system.
Figure 21:
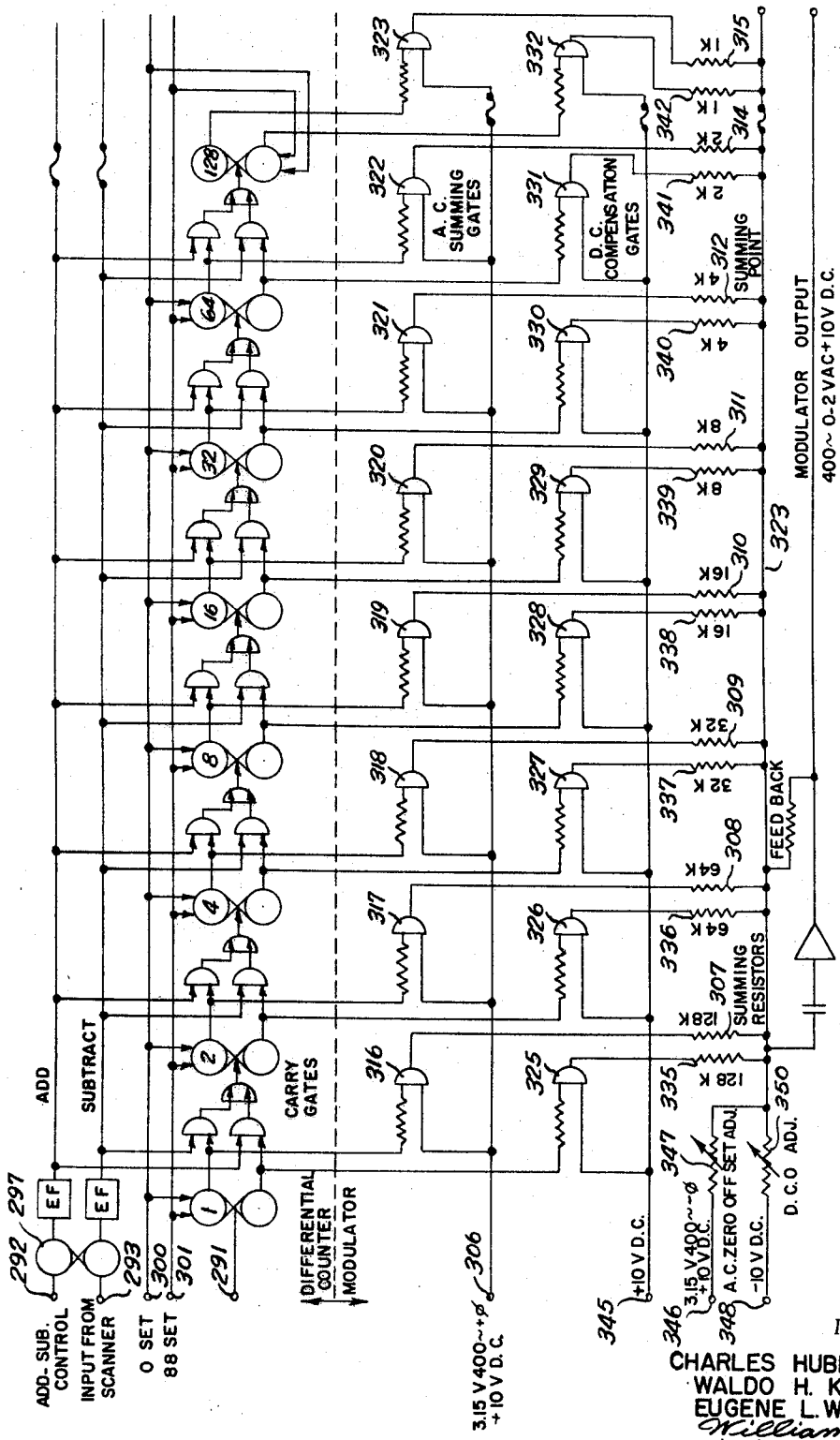

Referring to FIG. 19, the plus X command pulses for the table A assembly are delivered by the director to terminal 250 and minus X command pulses therefor to terminal 251; the plus pulses for the table B assembly to terminal 250' and minus pulses therefor to terminal 251'. In addition, plus and minus pulses are available at terminals 255, 256, 255' and 256' for "jog" operation of the A and B assemblies. Auxiliary function "down" and "up" signal pulses are delivered by the control apparatus to terminals 260 and 261 for controlling energization of solenoid 146 for lowering the stylus in the operating station into and out of engagement with the work to be marked; "on" and "off" signal pulses for causing the stylus to produce dash lines are delivered to the terminals 262 and 263; and an "index" signal pulse for controlling energization of solenoid 200 for indexing the stylus turret T to terminal 264.

Figure 18:
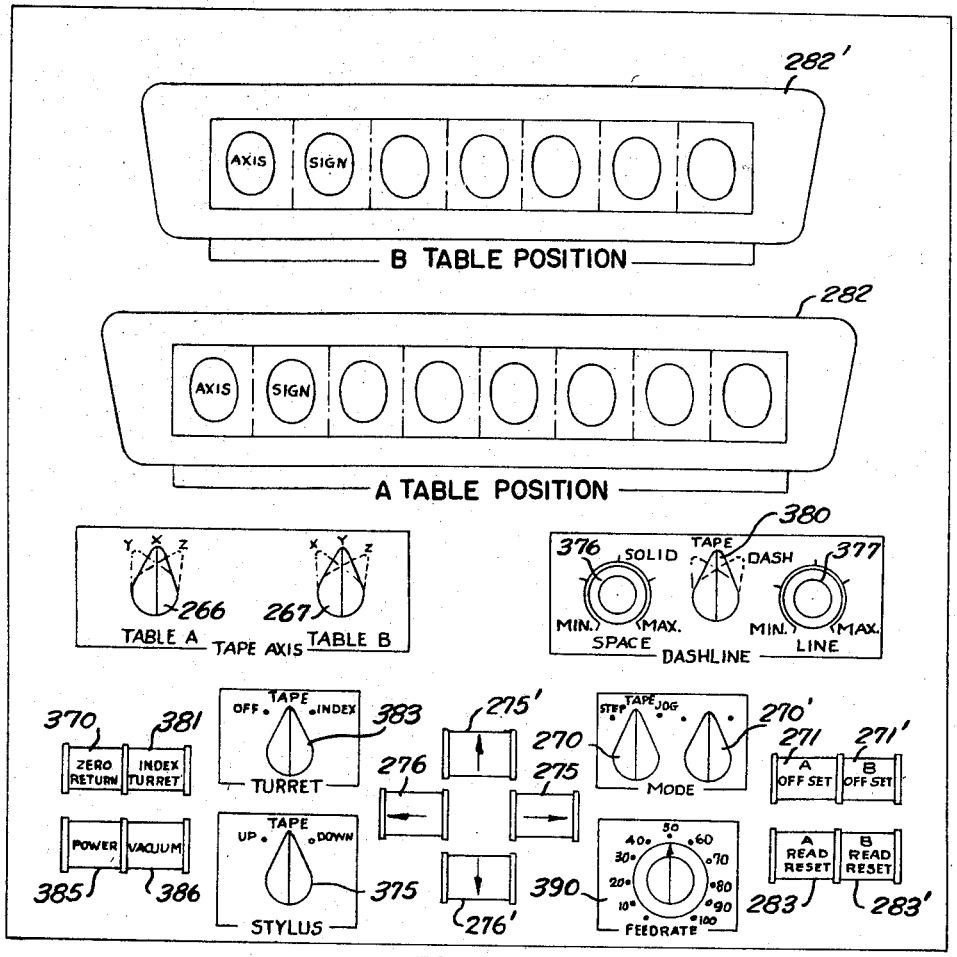
FIGURE 18 is a fragmentary view of a control panel showing part of the controls employed.

In the preferred embodiment shown, the control apparatus is capable of producing X, Y and Z control or tape axis commands and either of these commands may be connected by "tape axis" selector switches 266, 267, see FIG. 18, to either "table A" or "table B" movable assemblies.

From terminals 250, 251 the plus and minus control apparatus command pulses are transmitted or fed to a manually operable three-position mode selector switch or control 270. The plus and minus jog pulses are also transmitted to the mode selector switch 270 by way of manually operated plus and minus jog and step switch controls 275, 276. When the mode selector switch 270 is in one position, sometimes hereafter referred to as its normal position, the command pulses are transmitted to a manually operable zero offset switch or control 271; when in a second position, the zero offset control 271 is connected to the jog and step push button switch controls 275, 276, and jog pulses may be fed from the terminals 255, 256 to the zero offset control 271 by manual operation of push button switch controls 275, 276; and when in a third position, step pulses may be transmitted to the zero offset control by manual operation of switch controls 275, 276. A single pulse is fed to the zero offset control upon each actuation of either of the push button control switches 275, 276 when the mode selector switch 270 is in jog position and a series of pulses when the mode selector switch is in step position. While the two mode selector switches 270 and 271' are shown as discrete controls, this is done for purposes of illustration, as both selectors are preferably connected to a single shaft and operated from one position to the other by a single manually engageable knob.

The zero offset control 271 is a manually operable selecting switch which is normally set so that the pulse or minus impulses delivered thereto continue onto a pulse separator 280, but which can be set in a second position to deliver the pulses to an add-subtract counter 281, connected to a stylus table A-axis position indicator or readout 282. The counter is provided with a push button reset control 283.

The plus or minus command pulses coming from the zero offset control 271, when in its normal and operating position, are transmitted to the pulse separator 280, as previously stated, along with plus or minus A-axis pulses from transducer 52. The function of the pulse separator is to separate in time the pulses from the command source and from the transducer 52 so that even those coming simultaneously will be separated in time as they are transmitted from the pulse separator to a differential counter 285.

Figure 20:
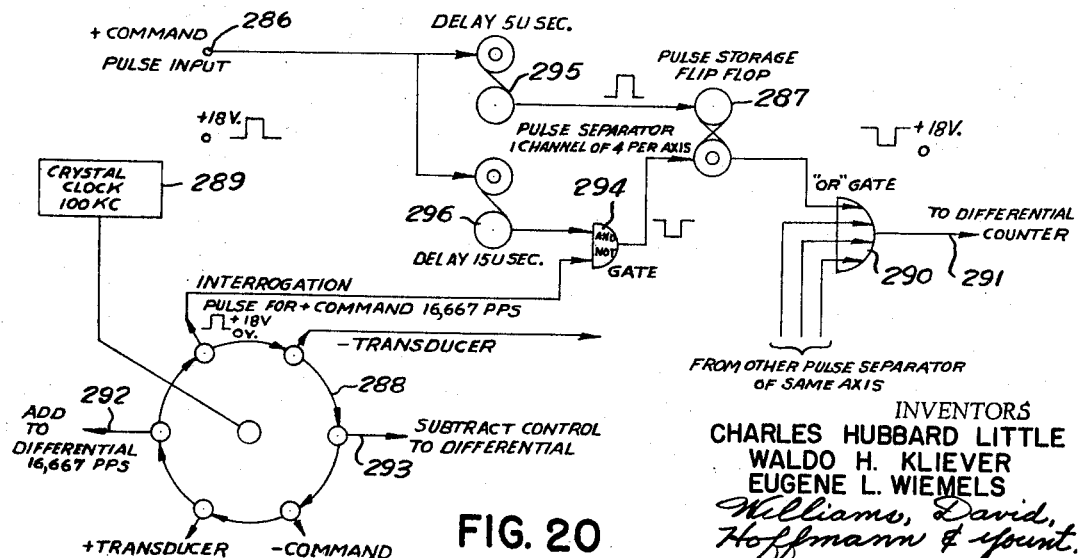
FIGURES 20 and 21 are detailed schematic drawings of portions of FIGURE 19.

The operation of the separator is illustrated in the schematic diagram, FIG. 20. Each command pulse is stored in a storage flip-flop, there being such a flip-flop for each of the four pulse sources, that is, command plus and minus and transducer plus and minus. Only the plus command input terminal or source 286 and the storage flip-flop 287, therefore, are shown in FIG. 20. A scanner 288, operating at a rate controlled by a crystal clock 289, operates like a commutator to interrogate or pulse the storage flip-flops successively. Pulses stored in the storage flip-flops are emitted through channel 291, the respective four channels or gates 290 connected therewith at intervals controlled by the interrogating pulse. The scanner also provides for switching the differential counter between add and subtract modes by supplying pulses from additional add and subtract control terminals or leads 292, 293, as shown in FIG. 20. For the scanner function, any of a number of shift register or counter tube techniques may be applied. In the preferred embodiment, a ring of flip-flops is stepped by the crystal clock to feed pulses successively into the output lines.

To prevent interference in cases where the command pulse and the interrogating pulse come into the separator channel simultaneously an *and not* gate 294 allows the command pulse full authority during a period of time of ten microseconds due to the action of one shot flip-flop delay units 295, 296.

If the interrogate pulse is inhibited because of a simultaneous command pulse in the same channel, the timing is designed so that another interrogation pulse will remove the pulse from storage before another command pulse can occur in that channel. It will be recognized by those skilled in the art that other storage devices, for example, a magnetic core and other types of delay devices could replace those referred to.

The differential counter 285 computes a binary number which at each instant represents the difference between the pulses received from the command and those received from the transducer. In the preferred embodiment transsistor flip-flops are used although other types of counters, such as magnetic cores, tube flip-flops or counter tubes would be applicable. When the scanner passes the line or terminal 292, marked add control, the counter is switched so that pulses coming in will increase its count. This is accomplished by the control of carry gates so that any flip-flop returning from the set to the reset or zero position will produce a carry pulse to the next stage. The add control pulse from the scanner switches the add-subtract control flip-flop 297, which in turn holds the carry gates in the add mode until a subtract command is given later in the cycle. The counter will next receive a plus command pulse and a pulse from the transducer, which latter pulse must be negative, in order that the counter can produce the difference. The scanner will next provide a subtract control pulse followed by pulses from the command and transducer if such pulses have been stored subsequent to the last interrogation.

There are provisions in the counter for introducing pulses over channels 300 and 301 which set the counter to zero for test purposes or provide an 88 bit command for zero return to be described later.

Since the servo motors 45, 46 for the A assembly are two-phase motors operating from 400 cycle alternating current supply, the number stored digitally in the differential counter 285 must be converted in a modulator 305 to a 400 cycle voltage which is proportional to the digit number. The counter shown has a chain of seven binary flip-flops and the modulator is so designed that it provides a zero output when the counter reads 127. As the counter moves from 127 toward its zero the 400 cycle will decrease in value and have a given phase and if the counter moves from a 128 to 225, the 400 cycle will be of increasing value. The 400 cycle control signal at 3.15 volt is introduced at terminal 306 along with a plus 10 volt direct current which maintains the instantaneous voltage always positive. This is switched into the respective summing resistors 307–315 by summing gates 316–322 controlled from the differential counter flip-flops. The summing resistors are weighted so that the smallest or unit number passes through a high resistance of 128,000 ohms while the most significant or highest number passes through a low resistance of 1000 ohms. Thus when any flip-flop is in its set position it produces a current in the summing channel or point 323 corresponding to the value of the number which that flip-flop represents. The summing resistors feed into a feedback operational amplifier according to principle well known in the analog computer art.

In order to eliminate steps in the direct current input to the amplifier when the flip-flops change, the reset position of the flip-flops also operates gates 325–332 into summing resistors 335–342, but the gates switch only a plus 10 volt direct current value from source or terminal 345 without the 400 cycle component.

In order to provide zero 400 cycle output when the counter is at a reading of 127, a 400 cycle source 346 of opposite phase to that used on the gates is permanently connected into the summing point through a resistor 347 which is shown adjustable. The direct current component in the summing point is eliminated by an additional minus 10 volt direct current source 348 through an adjustable summing resistor 350.

With this modulator a 400 cycle output is provided at the output terminal, which varies in amplitude and sign according to the digital setting of the differential counter.

The 400 cycle alternating current voltage from the modulator 305 is transmitted through line or channel 350 to preamplifiers 360, 361 and power amplifiers 362, 363 of the respective servos 45, 46 which drive the two ends of the movable A assembly. The inputs through the preamplifiers also receive signals from the respective tachometers 48, 49 and the preamplifier 361 from the synchro control transformer 57. An input for quadrature compensation signals is also provided which correct quadrature noise signals at zero from the tachometer, control transformer and other devices. In any specific preamplifiers the various 400 cycle inputs are summed through summing resistors into a feedback operational type amplifier. They are then shifted in phase by 90° and after further amplification are applied to the amplifier phases of the 400 cycle servomotors 45, 46.

In the case of the two A assembly servos 45, 46, each of them receives the main signal controlled by the modulator 305. The purpose of the two synchros 56, 57 is the coordination of the motions of the two servos 45, 46 by producing a corrective signal for servo 57 which causes it to advance or retard, if necessary, to maintain the B beam perpendicular to the A–1 and A–2 beams.

The control for the B servo motor 47 is the same as that described for the servo motors 45, 46 connected to the A assembly except that it has no synchros and will not be described in detail. The corresponding parts on FIGS. 18 and 19 are, however, identified by the same reference characters as used in describing the A assembly control, but with a prime mark affixed thereto.

It will be understood, however, that as an alternative construction the synchros 56, 57 could be omtted and the carriage Q provided with a transducer and its movement controlled in a manner similar to that in which the movement of the carriage P is controlled As previously stated the tape may have coded therein two or three axes information, for example, X and Y axis information or X, Y and Z axis information and the two switches 266 and 267 on the control panel are provided for selecting which axis of tape information is used in the A-axis of the table and which in the B-axis of the table. The switches make it possible to select any view of the workpiece being drawn or to successively draw several views in different desired positions. The drafting machine can be provided with a rotating table section and the tape provided with rotational axes information, if desired. The switches 266 and 267 provide signals which control gating circuits in the director. By this method the need for unnecessary long leads carrying signals is obliterated thereby reducing problems of stray noise.

The control apparatus also comprises switching means for reversing the sign of the signals or impulses being fed into either the A or B axes of the table. This reversal takes place within the control apparatus which also provides sign reverse signals or pulses for the sign reverse control 365 and 365' which reverse the transducer signals or pulses to the readouts. The sign reverse signals or pulses for reversing the signs of the transducer pulses or signals also provides plus or minus signs on the readouts to be described.

It is important to many applications of the apparatus that there be provided as a reference a point on the table which is absolute A-axis zero and B-axis zero. This point is mechanically determined so that if through loss of power or for other reasons the flow of data to the counters is interrupted, it will be possible to reestablish any position on the table or drawing. This zero-zero point is reached by depressing a zero return button 370, shown on the panel, FIG. 18. When this button is depressed, by appropriate relay switches and time delay circuitry, the 400 cycle signal from the A and B modulators 305, 305' are disconnected and a 400 cycle signal is provided to the servo amplifiers for both the A and B table axes to cause both the A servos 45, 46 and the B servo 47 to move the movable A and B assemblies toward the A-axis zero and the B-axis zero. As the A and B assemblies approach the mechanical stops 62 and 63, trips 67 and 68 carried thereby actuate zero approach switches 65, 66 on beams A-1 and B. These switches reduce the 400 cycle input to the servo motors to slow down the movable A and B assemblies so that they approach the mechanical stops slowly. The actuation of the zero approach switches 65, 66 also starts time delay devices 371 and 371' which allow ample time for the movable assemblies to arrive at their mechanical stops and be held there with sufficient pressure to insure fixed positions. When the time delay expires, numbers 88 are preset into each of the differential counters 285 and 285' and the zero return button is released. The release of zero return button returns the modulator signals to servo control. The servos will then move assemblies A and B .088" from the mechanical stop thereby reducing the signal in the differential counter to zero. This position is defined table A and B zero or merely as table zero.

If differences larger than 128 bits are introduced into the differential counters they will reverse their drive signal and subsequent data will have no value. This is an abnormal condition and protection is provided by out of synchronism controls 372 and 372' which cause signals to be emitted to the control apparatus to stop the pulse trains, if for any reason the signals in either differential counter becomes larger than 96 bits. The out of synchronism detectors 372 and 372', shown in FIG. 19, monitor the differential counter outputs.

The stylus is caused to make contact with the paper by energization of solenoid 146, as already indicated. This is controlled by relays with holding circuits. A signal from the tape coming through the control apparatus to terminal 260 and calling for stylus down will operate relay and holding circuits which will hold or maintain the solenoid 146 energized after the short pulse from the control apparatus is no longer active. When a pulse from terminal 261 is produced by appropriate tape coding, the holding circuit is broken by another relay so that the solenoid releases the stylus. The relays can also be operated by a manual stylus control to remain in either the up or down position.

A dash line generator 376, also controlled from the stylus control 375, provides for interrupting the circuit to solenoid 146 so that it is intermittently caused to go up and down thereby making a dash line. The dash line generator 376 is basically a free-running multivibrator and the length of lines and the space between lines are independently variable by line and space controls 377 and 378 on the dash-line section of the control panel. The on time for one of the transistors of the multivibrator is controlled by the size of a capacitor and a rheostat which control the feedback. Likewise the on time of the other transistor of the multivibrator is controlled by another capacitor and rheostat. By connecting the output of one transistor into an appropriate power amplifier to operate the solenoid 146, the stylus will be in the down position for one state of the multivibrator and in the up position for the other state of the multivibrator. The one rheostat, therefore, will control the length of time that the stylus is down and, in turn, the length of the line or dash produced. This rheostat is operated by the line length control 377. Likewise, the other rheostat, operated by control 378, controls the up time of the stylus and, therefore, the length of space between the lines. The manual override control switch 380, on the dash-line control section of the control panel, makes it possible to select dash lines manually or to insure a continuous solid line which the tape cannot alter.

The drafting apparatus, as previously described, may or may not be provided with a rotary turret provided with different pens or other scribing styli or other tools. The preferred embodiment shown and described has such a turret T advanced always in the same direction by a step equal to the space between the tools. This step is produced by energization of the rotary solenoid 200, already indicated, upon the reception of a single input pulse from the control apparatus by way of terminal 264 as a result of instruction coded in the tape. Indexing of the turret T may also be effected by the depressing of turret index push button 381 on the control panel. The indexing of the turret may be placed under control of the control apparatus or the turret index switch or disconnected from all sources of signals and the possibility of turret advance thus prevented by a turret control selector switch 383 on the control panel. When a pulse is introduced into the control circuit for indexing the turret T, a monostable flip-flop unit maintains an output signal of sufficient time duration to insure a full stroke of solenoid 200.

The purpose of the tachometers 48, 49 and 50 in the servo system is to stabilize the system against overshooting or hunting. In the case of the drafting apparatus, sufficient dampening from the tachometers is normally introduced so that if, at any time, a command signal is suddenly interrupted the stylus will not overshoot the position called for. There will be some rounding of corners if the command direction is suddenly changed and the control system, either with or without instruction from the tape, is made to anticipate sharp corners and with the tachometer the command is made slower or interrupted to allow time for the stylus to reach the corner before a command for a new direction is introduced. If the application requires only modest accuracy, such precaution may be omitted.

The control shown for the automatic drafting apparatus includes two indicators or readouts 282, 282' which give the table position of the stylus in terms of the position of the A and B movable assemblies. These normally read achieved motion of the respective movable assemblies by accumulating pulses from the A and B transducers 52, 53. The accumulated number normally starts with zero for the zero table position, but other zeroes may be set, as will presently be described. In principle, each indicator shows the position of a decimal add and subtract counter. When a transducer plus pulse comes on the plus A or plus B lead, it operates a flip-flop to switch the counter to the add mode position. The pulse is delayed to allow time for a flip-flop to introduce the add control into the carry gates after which the pulse is added. A similar operation takes place for a transducer negative pulse on the negative leads except that the add subtract control flip-flop is placed in the subtract mode.

For some applications it is desired that the position indicator start from a zero at some other place on the table than the defined table zero-zero, or that it operate with respect to a point off the table. For this purpose the counters and indicators can be disconnected from the servo controls and pulses introduced therein by depressing the zero offset push buttons 271 and 271', shown on the control panel. Such pulses may originate from the jog control switches or the step controlled switches or, if desired, from tape readings. In the normal use of this feature, the stylus is returned to its zero-zero table position before the desired plus or minus offset is introduced.

The indicators 282, 282' also provide for indicating which tape axis information has been selected by controls 266 and 267 for the table A and B axis and for indicating whether a sign reversal has been called for.

A push button switch 385 on the control panel is provided for starting and stopping the vacuum pump connected to the vacuum chuck 15 which holds the medium to be marked on the table. This system has an interlock switch such that if a vacuum is called for and not achieved, the controls will prevent the stylus from going down and the servos from operating.

The control apparatus, referred to, includes a manually operable feed rate control 390, shown on the control panel. The feed rate control determines the speed at which the stylus moves over the material to be marked and proportions the speed between the A and B assemblies in accordance with information received from the tape.

From the foregoing description of the preferred embodiment of the invention and alternate constructions mentioned, it will be apparent that the objects of the invention heretofore enumerated and others have been accomplished. While the preferred embodiment of the invention has been described in considerable detail, it is to be understood that alternative constructions and arrangements may be employed, for example, screws, tapes, etc., could be substituted for the racks shown, the apertures in the turret head for supporting the styli, which are shown cylindrical, could be any other suitable shape, etc., and the information source could be absolute as well as incremental digital data and the servo control may utilize absolute as well as incremental information, etc.

It is the intention to hereby cover all embodiments of the invention which come within the practice of those skilled in the art to which it relates and the appended claims.

Having described our invention, we claim:

1. In a drafting machine: a table for supporting an article to be marked; first and second beams; means attaching said beams to said table in parallel spaced relation to one another; a first movable assembly extending between and carried by said first and second beams; first and second individual digitally controlled signal responsive motor means on opposite ends of said assembly responsive for moving said first assembly back and forth on said beams; a second movable assembly on said first movable assembly, third individual digitally controlled signal responsive motor means on said second assembly for moving said second assembly back and forth on said first assembly; stylus means on said second movable assembly for marking an article supported on said table; and electronic control means for controlling the energization of said motor means whereby said stylus means is caused to traverse the article supported on said table in a predetermined manner, said control means comprising an input source of digital pulse information, a table source of digital pulse information, pulse separator means for combining digital pulses from said sources of information and for time-separating said pulses, and circuit means for interconnecting said sources of pulse information, said pulse separator means and said motor means.

2. In a drafting machine: a table for supporting an article to be marked; first and second beams, means attaching said beams to said table in parallel spaced relation to one another; first and second rack means attached to said first and second beams, respectively, and extending lengthwise therealong; a first movable assembly extending between and carried by said first and second beams; first and second individual signal responsive motor means on opposite ends of said assembly responsive for moving said first assembly back and forth on said beams; said first movable assembly including a third beam extending between said first and second beams; a third rack means connected to said third beam and extending lengthwise therealong; a second movable assembly on said first movable assembly, third individual signal responsive motor means on said second assembly for moving said second assembly back and forth on said first assembly; said first, second and third signal responsive motor means on said first and second movable assemblies geared to said first, second and third rack means, respectively, for moving said assemblies; stylus means mounted on said second movable assembly for marking an article supported on said table; solenoid means for controlling movement of said stylus means into and out of contact with the article to be marked supported on said table; and electronic control means including an input source of incremental pulses for controlling energization of said first, second, and third motor means, and for controlling energization of said solenoid means for moving said stylus means into and out of contact with an article to be marked supported on said table, said control means further including digital means for sensing the movement of said movable assemblies and providing incremental pulses representative of such movement; and electronic means operatively connected to said input source and said digital means for combining in timed relationship said incremental pulses from said input source with said incremental pulses from said digital means to thereby controllably energize said motor means.

3. In a drafting machine: a table for supporting an article to be marked; first and second beams, means attaching said beams to said table in parallel spaced relation to one another; first and second rack means attached to said first and second beams, respectively, and extending lengthwise therealong; a first movable assembly extending between and carried by said first and second beams; first and second individual signal responsive motor means on opposite ends of said assembly responsive for moving said first assembly back and forth on said beams; said first movable assembly including a third beam extending between said first and second beams; a third rack means connected to said third beam and extending lengthwise therealong; a second movable assembly on said first movable assembly, third individual signal responsive motor means on said second assembly for moving said second assembly back and forth on said first assembly; said first, second and third signal responsive motor means on said first and second movable assemblies geared to said first, second and third rack means, respectively, for moving said assemblies; synchro means operatively connected to opposite ends of said first movable assembly for coordinating the movement of said ends with one another; stylus means mounted on said second movable assembly for marking an article supported on said table; solenoid means for controlling movement of said stylus means into and out of contact with the article to be marked supported on said table; and electronic control means including an input source of incremental pulses for controlling energization of said first, second, and third motor means, and for controlling energization of said solenoid means for moving said stylus means into and out of contact with an article to be marked supported on said table, said control means further including digital means for sensing the movement of said movable assemblies and providing incremental pulses representative of such movement; and electronic means operatively connected to said input source and said digital means for combining in timed relationship said incremental pulses from said input source with said incremental pulses from said digital means to thereby controllably energize said motor means.

4. In a drafting machine: a table for supporting an article to be marked; first and second beams, means attaching said beams to said table in parallel spaced relation to one another; first and second carriages on said first and second beams, respectively, and movable back and forth thereon; a third beam connected to said first and second carriages and forming therewith a first movable assembly; a third carriage on said third beam, movable back and forth thereon and forming a second movable assembly; first motive power means for moving said first movable assembly; second motive power means for moving said second assembly; means on said third carriage compensating for differences in weight between said first movable assembly and said second movable assembly whereby the moments of inertia of said movable assemblies are approximately the same; stylus means mounted on said second movable assembly for marking an article supported on said table; solenoid means for controlling movement of said stylus means into and out of contact with the article to be marked supported on said table; and means including a source of incremental pulses for controlling energization of said first motive power means, another source of incremental pulses for controlling energization of said second motive power means, and a third source of pulses for controlling energization of said solenoid means for moving said stylus means into and out of contact with an article to be marked supported on said table.

5. In a drafting machine: a table for supporting an article to be marked; first and second beams, means attaching said beams to said table in parallel spaced relation to one another; first and second rack means attached to said first and second beams, respectively, and extending lengthwise therealong; first and second carriages on said first and second beams, respectively, and movable back and forth thereon; a third beam connected to said first and second carriages and forming therewith a first movable assembly; a third rack means connected to said third beam and extending lengthwise therealong; a third carriage on said third beam, movable back and forth thereon and forming a second movable assembly; first, second and third motive power means on said first, second and third carriages geared to said first, second and third rack means, respectively, for moving said assemblies; means on said third carriage including a flywheel geared to said third rack compensating for differences in weight between said first movable assembly and said second movable assembly whereby the moments of inertia of said movable assemblies are approximately the same; stylus means mounted on said second movable assembly for marking an article supported on said table; solenoid means for controlling movement of said stylus means into and out of contact with the article to be marked supported on said table; and means including a source of incremental pulses for controlling energization of said first and second motive power means, another source of incremental pulses for controlling energization of said third motive power means, and a third source of pulses for controlling energization of said solenoid means for moving said stylus means into and out of contact with an article to be marked supported on said table.

6. In a drafting machine: a table for supporting an article to be marked; first and second beams, means attaching said beams to said table in parallel spaced relation to one another; first and second rack means attached to said first and second beams, respectively, and extending lengthwise therealong; first and second carriages on said first and second beams, respectively, and movable back and forth thereon; a third beam connected to said first and second carriages and forming therewith a first movable assembly; a third rack means connected to said third beam and extending lengthwise therealong; a third carriage on said third beam, movable back and forth thereon and forming a second movable assembly; first, second and third motive power means on said first, second and third carriages geared to said first, second and third rack means, respectively, for moving said assemblies; an indexible stylus turret on said second movable assembly; first solenoid means for indexing said stylus turret; styli means mounted in said indexible stylus turret for marking an article supported on said table and adapted to be sequentially located in an operating station upon indexing of said stylus turret; means including a source of incremental pulses for controlling energization of said first and second motive power means, another source of incremental pulses for controlling energization of said third motive power means, a third source of pulses for controlling energization of said first solenoid means for indexing said stylus turret and a fourth source of pulses for controlling energization of said second solenoid means for controlling movement of a stylus means in said operating station into and out of contact with an article to be marked supported on said table.

7. In a drafting machine: a table for supporting an article to be marked, first and second beams, means attaching said beams to said table in parallel spaced relation to one another, first and second rack means attached to said first and second beams, respectively, and extending lengthwise therealong; first and second carriages on said first and second beams, respectively, and movable back and forth thereon; a third beam connected to said first and second carriages and forming therewith a first movable assembly; a third rack means connected to said third beam and extending lengthwise therealong, a third carriage on said third beam movable back and forth thereon and forming a second movable assembly; first, second and third motive power means on said first, second and third carriages geared to said first, second and third rack means, respectively, for moving said assemblies; synchro means operatively connected to said first and second carriages for coordinating their movement with one another; means on said third carriage including a flywheel geared to said third rack compensating for differences in weight between said first and second movable assemblies whereby the moments of inertia of said movable assemblies are approximately the same; an indexible stylus turret on said third carriage; first solenoid means for indexing said stylus turret; styli means mounted in and indexible stylus turret for marking an article supported on said table and adapted to be sequentially located in an operating station upon indexing of said stylus turret; second solenoid means for controlling movement of a stylus means in said operating station into and out of contact with the article to be marked supported on said table; and means including a numerical control continuous path or contouring director and cooperating digital transducers on each of said movable assemblies for controlling energization of said first, second and third motive power means on said carriages and energization of said second solenoid means for moving said stylus means into contact with the article to be marked supported on said table.

8. In a drafting machine: a table for supporting an article to be marked; first and second tubular beams, each of said beams having at least one planar side with at least one V way on said planar side; means attaching said beams to said table in parallel spaced relation to one another with said planar sides normal to the plane of said table; a first movable assembly extending between and carried by said first and second beams; first and second independent signal responsive motor means on opposite ends of said assembly responsive for moving said first assembly back and forth on said beams; said first movable assembly including a third tubular beam, having at least one planar side with at least one V way on said planar side, said planar side being normal to the plane of said table, extending between said first and second beams; an internal web in each of said beams extending from one side thereof to said planar side parallel to the plane of said table; a second movable assembly on said third beam movable back and forth thereon; and a drafting instrumentality connected to said second movable assembly.

9. In a drafting machine: a table for supporting an article to be marked; first and second tubular beams, each of said beams having at least one planar side with at least one V way on said planar side; means attaching said beams to said table in parallel spaced relation to one another; a first movable assembly extending between and carried by said first and second beams; first and second individual signal responsive motor means on opposite ends of said assembly responsive for moving said first assembly back and forth on said beams; said first movable assembly including a third tubular beam extending between said first and second beams, having at least one planar side with at least one V way on said planar side, said planar side being normal to the plane of said table, extending between said first and second beams; an internal web in each of said beams extending from one side thereof to said planar side parallel to the plane of said table; a second movable assembly on said first movable assembly, third individiual signal responsive motor means on said second assembly for moving said second assembly back and forth on said first assembly; a plurality of electrical conductors on the underside of each of said beams; means insulating said conductors from said beams; a projection on each of said movable assemblies extending underneath the said beam along which it travels; a plurality of resilient current collectors carried by each of said projections and in sliding contact with one of said electrical conductors; and a drafting instrumentality connected to said second movable assembly.

10. In a stylus head for a drafting or like marking apparatus: a frame; a turret body rotatably supported in said frame and having a plurality of apertures therethrough parallel with the axis of rotation thereof and symmetrically spaced about said axis of rotation; each of said apertures being adapted to receive a discrete stylus assembly; means for indexing said turret body whereby styli carried thereby are sequentially indexed through a working station; means for moving a stylus in said working station into engagement with work to be marked; said index means comprising a plurality of ratchet teeth on said turret body; a bell crank lever having two arms and pivotally connected to said frame for movement about an axis parallel with the axis of rotation of said turret body and spaced therefrom; an indexing pawl pivotally connected to one arm of said bell crank level and adapted to cooperate with said ratchet teeth to index said turret body upon oscillation of said bell crank lever; an abutment on said turret body adjacent to each of said apertures therein; said other arm of said bell crank lever having an abutment adapted to sequentially engage one of said abutments on said turret body; and means for holding said abutments on said turret body in engagement with said abutment on said other arm of said bell crank lever.

11. In a stylus head for a drafting or like marking apparatus: a frame; a turret body rotatably supported in said frame and having a plurality of cylindrical apertures therethrough parallel with the axis of rotation thereof and symmetrically spaced about said axis of rotation; each of said apertures being adapted to receive a discrete stylus assembly; means for indexing said turret body whereby styli carried thereby are sequentially indexed through a working station; means for moving a stylus in said working station into engagement with work to be marked; said index means comprising a plurality of ratchet teeth on said turret body; a bell crank lever having two arms and pivotally connected to said frame for movement about an axis parallel with the axis of rotation of said turret body and spaced therefrom; an indexing pawl pivotally connected to one arm of said bell crank lever and adapted to cooperate with said ratchet teeth to index said turret body upon oscillation of said bell crank lever; an abutment on said turret body adjacent to each of said apertures therein; said other arm of said bell crank lever having an abutment adapted to sequentially engage one of said abutments on said turret body; and means for holding said abutments on said turret body in engagement with said abutment on said other arm of said bell crank lever.

12. In a stylus head for a drafting or like marking apparatus: a frame; a turret body rotatably supported in said frame and having a plurality of apertures therethrough parallel with the axis of rotation thereof and symmetrically spaced about said axis of rotation; each of said apertures being adapted to receive a discrete stylus assembly; spring means interposed between said turret body and a stylus in any of said apertures; means for indexing said turret body whereby styli carried thereby are sequentially indexed through a working station; means for moving a stylus in said working station against the bias of said spring interposed therebetween and said turret body; said index means comprising a plurality of ratchet teeth on said turret body; a bell crank lever having two arms and pivotally connected to said frame for movement about an axis parallel with the axis of rotation of said turret body and spaced therefrom; an indexing pawl pivotally connected to one arm of said bell crank lever and adapted to cooperate with said ratchet teeth to index said turret body upon oscillation of said bell crank lever; an abutment on said turret body adjacent to each of said apertures therein; said other arm of said bell crank lever having an abutment adapted to sequentially engage one of said abutments on said turret body; and means for holding said abutments on said turret body in engagement with said abutment on said other arm of said bell crank lever.

13. A stylus adapted to be supported in a movable supporting structure having one or more stylus receiving apertures therein and yieldable means for engaging the stylus: a cylindrical tubular body member adapted to be slidably supported in a stylus receiving aperture of a supporting structure; a second member at one end of said stylus body member slidably connected thereto for movement lengthwise of said body member; resilient means interposed between said members; means for limiting movement of said members in a direction away from one another under action of said resilient means; and a marking instrumentality secured to the end of said stylus body member other than the end at which said second member is located.

14. A stylus adapted to be supported in a movable supporting structure of a drafting machine and having one or more stylus receiving apertures therein and resilient means for engaging the stylus when moved therein in one direction; a cylindrical tubular body member adapted to be slidably supported in a stylus receiving aperture of a supporting structure in engagement with the resilient means thereof; a second member at one end of said stylus body member slidably connected thereto for movement lengthwise of said body member; resilient means interposed between said members and being relatively stronger than the resilient means of the supporting structure; means for limiting movement of said members in a direction away from one another under action of said resilient means; and a marking instrumentality movably secured to the end of said stylus body member other than the end at which said second member is located.

15. In an automatic drafting apparatus having a plurality of digitally controlled movable assemblies, a stylus head for marking a sheet-like article comprising: a frame member supported by one of said movable assemblies, said frame member being positionably mounted on said supporting assembly for movement toward and away from said article and being provided with means for effecting said movement; a turret member rotatably supported on said frame member; said turret member having a plurality of apertures therethrough; each of said apertures being adapted to receive a discrete stylus assembly; means for indexing said turret member including ratchet means whereby styli carried thereby are indexed through a working station; and means for moving a stylus in said working station into engagement with said sheet-like article.

16. In an automatic drafting apparatus having a plurality of digitally controlled movable assemblies, a stylus head for marking a sheet-like article comprising: a frame; a turret member rotataby supported in said frame, said turret member having a plurality of apertures therethrough; each of said apertures being adapted to receive a discrete stylus assembly; a ratchet mounted for movement with said turret, the number of teeth of said ratchet being in proportion to the number of stylus assemblies carried by said turret; a bell crank level having two arms and pivotally connected to said frame for movement about an axis parallel to the axis of rotation of said turret member and spaced therefrom; an indexing pawl pivotally connected to one arm of said bell crank lever and adapted to cooperate with said ratchet to index said turret member upon oscillation of said bell crank lever; a second arm of said bell crank lever being adapted to cooperate with a stylus in said turret member to index said turret member upon oscillation of said bell crank lever; oscillating means in operative engagement with said bell crank lever for turning said bell crank lever whereby styli carried by said turret member are indexed through a working station; and means for moving a stylus in said working station into engagement with said sheet-like article.

17. In an automatic drafting apparatus having a plurality of digitally controlled movable assemblies, a stylus head for marking sheet-like material comprising: a frame member supported by one of said movable assemblies, said frame member being positionably mounted on said supporting assembly; means for positioning said frame member on said movable assembly; a turret member carried by said frame member and supported for movement relative to said frame member, said turret member having at least one aperture therethrough; at least one stylus member supported by said turret member for movement within said aperture; means carried by said frame member and engaging said stylus member for moving said stylus into marking engagement with said sheet-like material; and means engaging said stylus for holding said stylus in place on said sheet-like material.

18. In an automatic drafting apparatus having a plurality of digitally controlled movable assemblies, a stylus head for marking sheet-like articles comprising: a frame member supported by one of said movable assemblies, said frame member being positionably mounted on said movable assembly; cooperating adjustable means carried by said frame member and said movable assembly for positioning said frame member on said movable assembly; a turret member carried by said frame member and supported for movement relative to said frame member, said turret member having at least one aperture therethrough; at least one stylus member supported by said turret member for movement within said aperture; means carried by said frame member and engaging said stylus member for moving said stylus into marking engagement with said sheet-like material; and means engaging said stylus for holding said stylus in place on said sheet-like material.

19. In an automatic drafting apparatus having a plurality of digitally controlled movable assemblies, a stylus head for marking sheet-like material comprising: a frame member supported by one of said movable assemblies, said frame member being positionably mounted on said supporting assembly; means for positioning said frame member on said movable assembly; a turret member carried by said frame member and supported for movement relative to said frame member, said turret member having at least one aperture therethrough; at least one stylus member supported by said turret member for movement within said aperture; a crank assembly mounted on said frame, said crank assembly being in contact with said stylus member for moving said stylus member into marking engagement with said sheet-like material; means in engagement with said crank assembly for turning the crank shaft of said assembly; and means engaging said stylus for holding said stylus in place on said sheet-like material.

20. In an automatic drafting apparatus having a plurality of digitally controlled movable assemblies, a stylus head for marking sheet-like material comprising: a frame member supported by one of said movable assemblies, said frame member being positionably mounted on said supporting assembly; means for positioning said frame member on said movable assembly; a turret member carried by said frame member and supported for movement relative to said frame member, said turret member having at least one aperture therethrough; at least one stylus member supported by said turret member for movement within said aperture; a crank assembly mounted on said frame, said crank assembly being in contact with said stylus member for moving said stylus member into marking engagement with said sheet-like material; a solenoid mounted on said frame, said solenoid being provided with an operating shaft; a link assembly connecting the operating shaft of said solenoid to said crank assembly so as to turn said crank assembly in response to the operation of said solenoid shaft; and means engaging said stylus for holding said stylus in place on said sheet-like material.

21. In an automatic drafting apparatus having a plurality of digitally controlled movable assemblies, a stylus head for marking sheet-like material comprising: a frame member supported by one of said movable assemblies, said frame member being positionably mounted on said supporting assembly; means for positioning said frame member on said movable assembly; a turret member carried by said frame member and supported for movement relative to said frame member, said turret member having at least one aperture therethrough; at least one stylus member supported by said turret member for movement within said aperture; a crank assembly mounted on said frame, said crank assembly being in contact with said stylus member for moving said stylus member into marking engagement with said sheet-like material; means in engagement with said crank assembly for turning the crank shaft of said assembly; a first lever supported by said frame member for movement relative to said stylus member and said turret member; a second lever supported by said frame member for movement relative to said stylus member and said turret member; means for bringing said levers into engagement with said stylus member when said stylus member is in marking engagement with said sheet-like material; and means for moving at least one of said levers out of engagement with said stylus member when said stylus member is out of marking engagement with said sheet-like article, said means also being operative to bring said lever into engagement with said turret member whereby turret member is moved relative to said frame member.

22. In a drafting machine: a table for supporting an article to be marked; first and second beams, means attaching said beams to said table in parallel spaced relation to one another; a first movable assembly extending between and carried by said first and second beams; first and second individual signal responsive motor means on opposite ends of said assembly responsive for moving said first assembly back and forth on said beams; a second movable assembly on said first movable assembly, third individual signal responsive motor means on said second assembly for moving said second assembly back and forth on said first assembly; stylus means mounted on said second movable assembly for marking an article supported on said table; solenoid means for controlling movement of said stylus means into and out of contact with the article to be marked supported on said table; means including a numerical control continuous path or contouring director providing a source of incremental pulses for controlling energization of said first and second motor means, another source of incremental pulses for controlling energization of said third motor means, and a third source of pulses for controlling energization of said solenoid means for moving said stylus means into and out of contact with an article to be marked supported on said table; means for selectively disconnecting said sources of incremental pulses for controlling said first, second, and third motor means and connecting supplemental sources for moving said assemblies to predetermined positions adjacent to one corner of said table; abutment means for discontinuing said movement; and means for moving said assemblies predetermined distances from said abutment means.

23. In a drafting machine: a table for supporting an article to be marked; first and second beams, means attaching said beams to said table in parallel spaced relation to one another; a first movable assembly extending between and carried by said first and second beams; first and second individual signal responsive motor means on opposite ends of said assembly responsive for moving said first assembly back and forth on said beams; a second movable assembly on said first movable assembly, third individual signal responsive motor means on said second assembly for moving said second assembly back and forth on said first assembly; stylus means mounted on said second movable assembly for marking an article supported on said table; solenoid means for controlling movement of said stylus means into and out of contact with the article to be marked supported on said table; means including a numerical control continuous path or contouring director providing a source of incremental pulses for controlling energization of said first and second motor means, another source of incremental pulses for controlling energization of said third motor means, and a third source of pulses for controlling energization of said solenoid means for moving said stylus means into and out of contact with an article to be marked supported on said table; means including a manual control for selectively disconnecting said sources of incremental pulses for controlling said first, second and third motor means and connecting supplemental sources for moving said assemblies to predetermined positions adjacent to one corner of said table; means for slowing down the movement of said assemblies as they approach said predetermined positions; abutment means for discontinuing said movement; and means for moving said assemblies predetermined distances from said abutment means.

24. In a drafting machine: a table for supporting an article to be marked; first and second beams; means attaching said beams to said table in parallel spaced relation to one another; a first movable assembly extending between and carried by said first and second beams; first and second individual digitally controlled signal responsive motor means on opposite ends of said assembly responsive for moving said first assembly back and forth on said beams; a second movable assembly on said first movable assembly, third individual digitally controlled signal responsive motor means on said second assembly for moving said second assembly back and forth on said first assembly; stylus means on said second movable assembly for marking an article supporting on said table; power means for controlling movement of said stylus means into contact with an article to be marked supported on said table; means including a free running multivibrator for intermittently energizing and de-energizing said power means; and electronic control means for selectively controlling the energization of said first, second and third motor means whereby said stylus means is caused to traverse and mark an article supported on said table in a predetermined manner, said control means comprising an input source of digital pulse information, a table source of digital pulse information, pulse separator means for combining digital pulses from said sources of information and for time-separating said pulses, and circuit means for interconnecting said sources of pulse information, said pulse separator means and said first, second, and third motor means.

25. A stylus mounting comprising: a body member having an aperture therethrough; a stylus supporting member slidably mounted within said aperture; a stylus detachably connected to one end of said supporting member; a flange member concentric with said supporting member and connected to the other end of said supporting member; a first operating spring disposed between said flange member and said body member; a first tubular member detachably connected to the flange and said supporting member; a second tubular member concentric with and detachably connected to said first tubular member and supported by said flange member; a cap member supported by said flange member and having a projection disposed within said first tubular member; and a second operating spring disposed between said second tubular member and said cap member.

26. In a drafting machine: a table for supporting an article to be marked; first and second beams, means attaching said beams to said table in parallel spaced relation to one another; a first movable assembly extending between and carried by said first and second beams; first and second individual signal responsive motor means on opposite ends of said assembly responsive for moving said first assembly back and forth on said beams; a second movable assembly on said first movable assembly, third individual signal responsive motor means on said second assembly for moving said second assembly back and forth on said first assembly; means on said second movable assembly compensating for differences in weight between said first movable assembly and said second movable assembly whereby the moments of inertia of said movable assemblies are approximately the same; stylus means mounted on said second movable assembly for marking an article supported on said table; solenoid means for controlling movement of said stylus means into and out of contact with the article to be marked supported on said table; and means including a source of incremental pulses for controlling energization of said first and second motor means, another source of incremental pulses for controlling energization of said third motor means, and a third source of pulses for controlling energization of said solenoid means for moving said stylus means into and out of contact with an article to be marked supported on said table.

27. In a drafting machine: a table for supporting an article to be marked; first and second beams, means attaching said beams to said table in parallel spaced relation to one another; first and second rack means attached to said first and second beams, respectively, and extending lengthwise therealong; a first movable assembly extending between and carried by said first and second beams; first and second individual signal responsive motor means on opposite ends of said assembly responsive for moving said first assembly back and forth on said beams; said first movable assembly including a third beam extending between said first and second beams; a third rack means connected to said third beam and extending lengthwise therealong; a second movable assembly on said first movable assembly, third individual signal responsive motor means on said second assembly for moving said second assembly back and forth on said first assembly; said first, second and third motor means on said first and second movable assemblies geared to said first, second and third rack means, respectively, for moving said assemblies; an indexible stylus turret on said second movable assembly; first solenoid means for indexing said stylus turret; styli means mounted in said indexible stylus turret for marking an article supported on said table and adapted to be sequentially located in an operating station upon indexing of said stylus turret; means including a source of incremental pulses for controlling energization of said first and second motor means, another source of incremental pulses for controlling energization of said third motor means, a third source of pulses for controlling energization of said first solenoid means for indexing said stylus turret and a fourth source of pulses for controlling energization of said second solenoid means for controlling movement of a stylus means in said operating station into and out of contact with an article to be marked supported on said table.

28. In a drafting machine: a table for supporting an article to be marked, first and second beams, means attaching said beams to said table in parallel spaced relation to one another, first and second rack means attached to said first and second beams, respectively, and extending lengthwise therealong; a first movable assembly extending between and carried by said first and second beams; first and second individual signal responsive motor means on opposite ends of said assembly responsive for moving said first assembly back and forth on said beams; said first movable assembly including a third beam extending between said first and second beams; a third rack means connected to said third beam and extending lengthwise therealong; a second movable assembly on said first movable assembly, third individual signal responsive motor means on said second assembly for moving said second assembly back and forth on said first assembly; said first, second and third motor means on said first and second geared to said first, second and third rack means, respectively, for moving said assemblies; synchro means operatively connected to the ends of said first movable assembly for coordinating the movement of said ends with one another; means on said second movable assembly including a flywheel geared to said third rack compensating for differences in weight between said first and second movable assemblies whereby the moments of inertia of said movable assemblies are approximately the same; an indexible stylus turret on said second movable assembly; first solenoid means for indexing said stylus turret; styli means mounted in said indexible stylus turret for marking an article supported on said table and adapted to be sequentially located in an operating station upon indexing of said stylus turret; second solenoid means for controlling movement of a stylus means in said operating station into and out of contact with the article to be marked supported on said table; and means including a numerical control continuous path or contouring director and cooperating digital transducers on each of said movable assemblies for controlling energization of said first, second and third motor means on said carriages and energization of said second solenoid means for moving said stylus means into contact with the article to be marked supported on said table.

29. In apparatus of the character referred to: a table for supporting a sheet-like article; first and second beams; means attaching said beams to said table in parallel spaced relation to one another; a first movable assembly extending between and carried by said first and second beams; first and second individual digitally controlled, signal responsive motor means on opposite ends of said assembly responsive for moving said first assembly back and forth on said beams; a second movable assembly on said first movable assembly; third individual digitally controlled, signal responsive motor means on said second assembly for moving said second assembly back and forth on said first assembly; instrument means on said second movable assembly movable over an article supported on said table; and electronic control means for controlling the energization of said motor means whereby said instrument means is caused to traverse the article supported on said table in a predetermined manner, said control means comprising an input source of digital pulse information, a table source of digital pulse information, pulse separator means for combining digital pulses from said sources of information, and for time-separating said pulses, and circuit means for interconnecting said sources of pulse information, said pulse separator means and said motor means.

30. In apparatus of the character referred to: a table for supporting a sheet-like article; first and second beams, means attaching said beams to said table in parallel spaced relation to one another; a first movable assembly extending between and carried by said first and second beams; first and second individual digitally controlled, signal responsive motor means on opposite ends of said assembly responsive for moving said first assembly back and forth on said beams; a second movable assembly on said first movable assembly; a third individual digitally controlled, signal responsive motor means on said second assembly for moving said second assembly back and forth on said first assembly; instrument means on said second movable assembly movable over an article supported on said table; and electronic control means for controlling the energization of said motor means whereby said instrument means is caused to traverse the article supported on said table in a predetermined manner, said control means comprising an input source of digital pulse information, a plurality of table sources of digital pulse information, pulse separator means for combining digital pulses from said input source of information and from at least one of said table sources of digital pulse information and for time separating said pulses, and circuit means for interconnecting said sources of pulse information, said pulse separator means and said motor means.

31. In apparatus of the character referred to: a table for supporting a sheet-like article; first and second beams; means attaching said beams to said table in parallel spaced relation to one another; a first movable assembly extending between and carried by said first and second beams; first and second individual digitally controlled, signal responsive motor means on opposite ends of said assembly responsive for moving said first assembly back and forth on said beams; synchro means operatively connected to opposite ends of said first movable assembly for coordinating the movement of said ends with one and another; a second movable assembly on said first movable assembly; a third individual digitally controlled signal responsive motor means on said second assembly for moving said second assembly back and forth on said first assembly; instrument means on said second movable assembly movable over an article supported on said table; and electronic control means for controlling the energization of said motor means whereby said instrument means is caused to traverse the article supported on said table in a predetermined manner, said control means comprising an input source of digital pulse information, a plurality of table sources of digital pulse information, pulse separator means for combining digital pulses from said input source of information and from at least one of said table sources of digital pulse information and for time separating said pulses, and circuit means for interconnecting said sources of pulse information, said pulse separator means and said motor means.

(References on following page)

References Cited

UNITED STATES PATENTS

| | | | |
|---|---|---|---|
| 2,716,675 | 8/1955 | Hoelscher | 191—45 |
| 2,822,929 | 2/1958 | Kruzic | 212—21 |
| 2,916,342 | 12/1959 | De Neergaard | 318—162 XR |
| 2,936,207 | 5/1960 | Beaumont et al. | 346—141 XR |
| 2,936,907 | 5/1960 | Woodruff | 212—15 XR |
| 2,937,913 | 5/1960 | Boyle. | |
| 2,999,317 | 9/1961 | Alderson | 33—26 |
| 3,032,881 | 5/1962 | Fengler | 33—23 |
| 3,037,760 | 6/1962 | Arnault | 33—23 |
| 3,066,868 | 12/1962 | Tripp | 235—151 |
| 3,067,517 | 12/1962 | Matson | 33—26 |
| 3,086,154 | 4/1963 | Lowther et al. | |
| 3,114,205 | 12/1963 | Bechtle | 33—23 |
| 3,143,804 | 8/1964 | Muldoon | 33—18 |
| 3,148,316 | 9/1964 | Herchenroeder | 318—20.310 X |

HARRY N. HAROIAN, *Primary Examiner.*